US012767864B2

(12) United States Patent
Schuh et al.

(10) Patent No.: US 12,767,864 B2
(45) Date of Patent: Oct. 20, 2026

(54) CURABLE ADHESIVE WITH IMPROVED DIECUTTABILITY AND IMPROVED SHOCK PROPERTIES

(71) Applicant: tesa SE, Norderstedt (DE)

(72) Inventors: Christian Schuh, Hamburg (DE); Nadine Wedel, Hamburg (DE); Bastian Kruskop, Norderstedt (DE); Lena-Marie Naujoks, Pinneberg (DE); Nora Erben, Hamburg (DE)

(73) Assignee: TESA SE, Norderstedt (DE)

( * ) Notice: Subject to any disclaimer, the term of this patent is extended or adjusted under 35 U.S.C. 154(b) by 640 days.

(21) Appl. No.: 18/119,942

(22) Filed: Mar. 10, 2023

(65) Prior Publication Data

US 2023/0287249 A1 Sep. 14, 2023

(30) Foreign Application Priority Data

Mar. 11, 2022 (DE) ..................... 10 2022 105 737.2

(51) Int. Cl.
*C09J 7/10* (2018.01)
*C09J 151/00* (2006.01)

(52) U.S. Cl.
CPC ............. *C09J 151/006* (2013.01); *C09J 7/10* (2018.01)

(58) Field of Classification Search
CPC ...... C09J 151/006; C09J 7/10; C09J 2453/00; C09J 153/00; C09J 7/385; C09J 2301/302; C09J 2467/005; C09J 2469/006
See application file for complete search history.

(56) References Cited

U.S. PATENT DOCUMENTS

2009/0311473 A1 12/2009 Husemann et al.
2016/0288473 A1* 10/2016 Schwartz .............. B32B 37/025
2020/0255699 A1 8/2020 Klingeberg et al.
2024/0084125 A1* 3/2024 Janoski .................. C09J 153/02

FOREIGN PATENT DOCUMENTS

| | | | |
|---|---|---|---|
| CN | 104968745 | A | 10/2015 |
| DE | 10 2006 042 816 | A1 | 6/2008 |
| DE | 10 2019 103 120 | A1 | 8/2020 |
| EP | 0 276 716 | A2 | 8/1988 |
| EP | 2 940 092 | A1 | 11/2015 |
| JP | 2021-191827 | A | 12/2021 |
| WO | WO 2010/029096 | A1 | 3/2010 |
| WO | WO 2022/144734 | A1 | 7/2022 |

OTHER PUBLICATIONS

KURARITY copolymer Product data sheet downloaded on Jan. 18, 2026.*
Product data sheet of EPON 828 downloaded on Jan. 18, 2026.*
Product data sheet of EPON 1001F downloaded on Jan. 18, 2026.*
Extended European Search Report for European Application No. 23159597.6, dated Jul. 11, 2023.
"EPON™ and EPI-REZ™ Epoxy Resins," Hexion, Product Selector, Feb. 2017, pp. 1-15 (16 pages total).
Lu et al., "New class of thermoplastic elastomers based on acrylic block copolymers," Advances in Thermoplastic Elastomers, 2024, pp. 125-149.

* cited by examiner

*Primary Examiner* — Kumar R Bhushan
(74) *Attorney, Agent, or Firm* — Birch, Stewart, Kolasch & Birch, LLP

(57) ABSTRACT

A curable adhesive includes, based on the mass of the curable adhesive: a) one or more (meth)acrylate block copolymers of the structure A-B-A in a combined mass fraction of 25% or more, b) one or more polymerizable first epoxide compounds E1 in a combined mass fraction of 5% or more, and c) one or more polymerizable second epoxide compounds E2 in a combined mass fraction of 5% or more, where the second epoxide compound E2 at 25° C. is a liquid, where the amount-of-substance-weighted polar component of the Hansen solubility parameters $<\delta_p>$ of the monomer units derived from A monomers in the A blocks, $<\delta_p>(A)$, is in the range from 9.0 to 11.0 $MPa^{0.5}$, and where the amount-of-substance-weighted polar component of the Hansen solubility parameters $<\delta_p>$ of the monomer units derived from B monomers in the B blocks, $<\delta_p>(B)$ is less than 9 $MPa^{0.5}$.

26 Claims, No Drawings

CURABLE ADHESIVE WITH IMPROVED DIECUTTABILITY AND IMPROVED SHOCK PROPERTIES

The invention relates to a curable adhesive and to a reactive adhesive tape comprising such a curable adhesive. Disclosed, moreover, are the use of such curable adhesives and reactive adhesive tapes for the bonding of two or more components, and also a process for producing such curable adhesives.

The joining of separate elements is one of the central processes in manufacturing. Besides other methods, such as welding and soldering, for example, an important significance is nowadays accorded in particular to adhesive bonding, i.e. to joining using an adhesive. One alternative to the use of formless adhesives which are applied from a tube, for example, are so-called adhesive tapes. Known from everyday life in particular are pressure-sensitive adhesive tapes, where a pressure-sensitive adhesive provides the bonding effect, which under typical ambient conditions is durably tacky and also adhesive. Such pressure-sensitive adhesive tapes may be applied by pressure to a substrate and remain adhering there, but later on can be removed again more or less without residue.

Particularly for use in industrial manufacturing, however, there is also another type of adhesive tapes of great significance. In these adhesive tapes, which are sometimes also referred to as reactive adhesive tapes, a curable adhesive is employed. In the state intended for application, curable adhesives of these kinds have not yet attained their maximum crosslinking, and can be cured by external influences, with initiation of the polymerization in the curable adhesive and a consequent increase in the crosslinking. This is accompanied by changes in the mechanical properties of the now cured adhesive, with increases in particular in the viscosity, the surface hardness and the strength.

Curable adhesives are known in the prior art and from a chemical standpoint may have very different compositions. A common feature of these curable adhesives is that the crosslinking reaction can be triggered by external influencing factors, as for example by supply of energy, more particularly through thermal, plasma or radiation curing, and/or by contact with a substance promoting the polymerization, as is the case with moisture-curing adhesives, for example. Corresponding adhesives are disclosed for example in DE 102015222028 A1, EP 3091059 A1, EP 3126402 B1, EP 2768919 B1, DE 102018203894 A1 and WO 2017174303 A1, U.S. Pat. No. 4,661,542 A.

The curability of such curable adhesives is achieved generally through the use of polymerizable compounds, especially of crosslinkable monomers or oligomers. These polymerizable compounds of low molecular mass, which in order to ensure sufficient curability must usually be employed in a significant mass fraction, are sometimes also referred to by the skilled person as reactive resins.

The low molecular mass reactive resins typically employed are generally liquids having a low viscosity. In combination with the high mass fraction in curable adhesives, this makes such curable adhesives generally of low viscosity themselves. Because of this, the processing properties of many curable adhesives from the prior art are perceived to be inadequate and, in the typical processing techniques of the adhesive industry, rational processing of curable adhesive involves the comparatively high cost and complexity. As well as the dimensional stability of the pressure-sensitive adhesives when adhesive tapes are wound up, the diecuttability in particular, i.e. the suitability for singulation of bonding elements by means of a diecutting process, is generally evaluated as being inadequate.

In the aim of optimal processing qualities for the end user, it is generally desirable, with curable adhesives as well, for these adhesives themselves to have at least weakly pronounced pressure-sensitive adhesive properties. It is desirable more particularly for reactive adhesive tapes to be able to be removed prior to curing if necessary with substantially no residue—if, for example, an adhesive tape is applied erroneously. However, the properties of curable adhesives that are governed by the high mass fraction of reactive resin frequently result in insufficient cohesion in the curable adhesive. Instead of the desired adhesive failure on the substrate, therefore, there may in many cases be a cohesive failure, so leaving residues of the adhesive on the substrate.

In the light of the observations above, there is a continued interest within the adhesive technology field in improving the processing qualities of curable adhesives, a particular aim being to improve the diecuttability and to boost the cohesion in the material.

In many cases, however, the measures that are known in the prior art for boosting the cohesion and/or for reducing the viscosity of the curable adhesives impair the later handling qualities of the reactive adhesive tapes, since there are also disadvantageous effects on the adaptation behaviour which is desired in application, namely the conformation of the curable adhesive in the reactive adhesive tape to the structuring of the substrate, particularly in the case of rough substrate surfaces, and so the peel adhesion which is achieved after curing, owing to inadequate contact with the substrate, may not meet the requirements imposed. Against this background, within the field of the curable adhesives there is generally a conflict of objective between sufficient cohesion in the curable adhesive and also its processing qualities during the production of adhesive tapes, on the one hand, and the handling qualities and bonding properties of the resultant reactive adhesive tapes, on the other hand.

Moreover, in the case of the curable adhesives known from the prior art and of the corresponding reactive adhesive tapes, in many cases the shock resistance as well is perceived as being inadequate, and so there is need to improve it.

The primary object of the present invention was to eliminate or at least reduce the above-described disadvantages of the prior art.

More particularly it was the object of the present invention to specify a curable adhesive for which the above-described conflict of objective between high cohesion and good processing qualities of the adhesive, especially a good diecuttability, on the one hand and the handling qualities and the achievable peel adhesion of the reactive adhesive tape, on the other hand, is optimally resolved.

Accordingly it was the object of the present invention to specify a curable adhesive which in spite of high mass fractions of reactive resin exhibits sufficient cohesion in order in subsequent use to attain a substantially adhesive failure on detachment from the substrate.

It was an object of the present invention that the curable adhesives to be specified ought to have an advantageous adaptation behaviour and ought to achieve excellent peel adhesion, even to substrates having rough surfaces, after curing.

It was a further object of the invention that the curable adhesives to be specified ought to have excellent shock resistance in the cured state.

In this context it was a supplementary object of the present invention that the pressure-sensitive adhesives to be specified ought ideally to be able to be produced as far as possible using starting materials and methods which are already employed in the field of bonding technology, in order to enable time-efficient and cost-effective production.

A supplementary object of the present invention was to provide an advantageous reactive adhesive tape and pressure-sensitive adhesive tape.

It was a secondary object of the present invention, moreover, to provide a use of the curable adhesives to be specified or of reactive adhesive tapes for the bonding of two or more components, and also a process for producing such curable adhesives.

The inventors of the present invention have now found that the objects described above can surprisingly be achieved if in curable adhesives which employ, as reactive resin, a specific mixture of liquid epoxide compounds and solid or high-viscosity epoxide compounds, a comparatively large amount of a (meth)acrylate block copolymer of the general formula A-B-A is employed in which A and B blocks are selected specifically, in the manner defined in the claims.

The aforesaid objects are therefore achieved by the subject matter of the invention as it is defined in the claims. Preferred embodiments of the invention are apparent from the dependent claims and the observations hereinafter.

Embodiments which are designated below as being preferred are combined in particularly preferred embodiments with features of other embodiments designated as being preferred. Especially preferred, therefore, are combinations of two or more of the embodiments designated below as being particularly preferred. Likewise preferred are embodiments in which a feature of one embodiment, designated to some extent as being preferred, is combined with one or more further features of other embodiments which are designated to some extent as being preferred. Features of preferred adhesive tapes, uses and processes are apparent from the features of preferred curable adhesives.

Accordingly, for an element, as for the (meth)acrylate block copolymers or an epoxide compound, for example, where not only specific amounts or fractions of that element but also preferred embodiments of the element are disclosed below, there is also disclosure in particular of the specific amounts or fractions of the elements with their preferred embodiments. There is also disclosure to the effect that in the case of the corresponding specific total amounts or total fractions of the elements, at least a part of the elements may be of preferred embodiment, and in particular also that elements of preferred embodiment may in turn be present in the specific amounts or fractions within the specific total amounts or total fractions.

The invention relates to a curable adhesive comprising, based on the mass of the curable adhesive:

a) one or more (meth)acrylate block copolymers of the structure A-B-A in a combined mass fraction of 25% or more,
   where the A blocks independently of one another stand for a poly(meth)acrylate having a glass transition temperature Tg of 50° C. or more which is preparable by polymerization of an A monomer composition composed of A monomers,
   where the B block stands for a poly(meth)acrylate having a glass transition temperature Tg of less than 50° C. which is preparable by polymerization of a B monomer composition composed of B monomers,
b) one or more polymerizable first epoxide compounds E1 in a combined mass fraction of 5% or more, where the first epoxide compound E1 at 25° C. is a solid or a high-viscosity substance having a dynamic viscosity of 50 Pa s or more, and
c) one or more polymerizable second epoxide compounds E2 in a combined mass fraction of 5% or more, where the second epoxide compound E2 at 25° C. is a liquid having a dynamic viscosity of 40 Pa s or less,
   where the amount-of-substance-weighted polar component of the Hansen solubility parameters $\langle\delta_p\rangle$ of the monomer units derived from A monomers in the A blocks, $\langle\delta_p\rangle(A)$, is in the range from 9.0 to 11.0 $MPa^{0.5}$, and
   where the amount-of-substance-weighted polar component of the Hansen solubility parameters $\langle\delta_p\rangle$ of the monomer units derived from B monomers in the B blocks, $\langle\delta_p\rangle(B)$ is less than 9 $MPa^{0.5}$.

The additions E1 and E2 here, which are purely labels, serve for a clearer and easier distinction between the two types of epoxide compounds for use in the invention.

These above-defined constituents are employed in each case as "one or more", in agreement with the understanding of the skilled person. The designation "one or more" in this context, in a manner customary in the sector, pertains to the chemical nature of the compounds in question and not to their amount of substance. For example, the curable adhesive may comprise as second epoxide compound E2 exclusively epoxycyclohexylmethyl 3',4'-epoxycyclohexanecarboxylate (dynamic viscosity at 25° C. about 0.25 Pa s), which would mean that the curable adhesive comprises a multiplicity of the molecules in question.

The mass fractions are reported typically as combined mass fractions of the one or of the two or more components, thereby expressing the fact that the mass fraction of the components embodied correspondingly, taken together, meets the corresponding criteria, with the mass of the curable adhesive being the reference system for each of the (meth)acrylate block copolymers, the first epoxide compounds E1 and the second epoxide compounds E2.

The curable adhesive of the invention is curable. As a result of the facility for curing, the curable adhesive is able to function as a structural adhesive after curing. According to DIN EN 923: 2006-01, structural adhesives are adhesives which form adhesive bonds which in a structure are able to retain a set strength for a predetermined relatively long period of time (according to the ASTM definition: "bonding agents used for transferring required loads between adherends exposed to service environments typical for the structure involved"). They are therefore adhesives for chemically and physically highly robust bonds which in the cured state contribute to strengthening the adhesive tapes.

Block copolymers in general and (meth)acrylate block copolymers specifically are well known from the prior art, including in particular block copolymers having the structure A-B-A. The production of (meth)acrylate block copolymers, of structure A-B-A for example, is described in the prior art; for the (meth)acrylate block copolymers to be used in the present case, as well, the processes for block copolymerization that are known from the prior art may in principle be employed. An illustrative overview of block copolymers which can be used for various purposes in various adhesives, among other applications, is found for example in documents US 2011003947 A1, US 20080200589 A1, US 2007078236 A1, US 2007078236 A1, US 2012196952 A1, US 2016032157 A1, US 2008146747 A1 and US 2016230054 A1.

In the (meth)acrylate block copolymers of structure A-B-A for use in the invention, the A blocks have a higher glass transition temperature than the B blocks. In accordance with the terminology sometimes also used for other block copolymers, the A blocks are sometimes also referred to as hard blocks, whereas the B block is also referred to as soft block. Accordingly, however, it should be noted that for the (meth)acrylate block copolymers identified by the inventors, in the estimation of the inventors, fundamentally higher glass transition temperatures may be provided, in the B block as well, than for some soft blocks known from the prior art. In accordance with the understanding of the skilled person, the glass transition temperature of the A blocks and of the B block is determined not on the (meth)acrylate block copolymer, but instead on the isolated (co)polymers of the respective blocks.

For the purposes of the present invention, the glass transition temperature of polymers or of polymer blocks in block copolymers is determined by means of dynamic scanning calorimetry (DSC), as is described in DIN EN ISO 11357. For this determination, around 5 mg of an untreated polymer sample are weighed out into an aluminium crucible (volume 25 μL) and closed with a perforated lid. For the measurement a DSC 204 F1 from Netzsch is used. For inertization, operations take place under nitrogen. The sample is first cooled to −150° C., then heated up at a heating rate of 10 K/min to +150° C., and cooled again to −150° C. The subsequent, second heating curve is run again at 10 K/min and the change in the heat capacity is recorded. Glass transitions are recognized as steps in the thermogram. The determination of the glass transition temperature from the DSC measurements is an easy matter for the skilled person and is described in more detail for example in EP 2832811 A1.

The two A blocks of the (meth)acrylate block copolymers are characterized by a common criterion for the glass transition temperature and also by the common possibility of production from the same A monomers. The skilled person understands that, by nature of their production, the A blocks have a high similarity, owing to the nature of the polymerization processes used for their production, particularly when two or more different A monomers are used, but need not be exactly identical. In analogy to the A and B blocks, this is also true of the (meth)acrylate block copolymer itself, since the skilled person in the field of polymeric materials would designate such block copolymers, which in terms of the A and B blocks differ from one another only in the realm of the production-related variation, as a common material, i.e. as a (meth)acrylate block copolymer.

In agreement with the understanding of the skilled person and with the customary approach in the field of art, it is useful to define polymeric and oligomeric compounds such as the A blocks and the B block by way of the production process and/or of the starting materials used for their production, it being impossible to provide a rational definition of the corresponding materials otherwise.

In curable adhesives of the invention, (meth)acrylate block copolymers are employed that consist of poly(meth) acrylate blocks. These (meth)acrylate block copolymers therefore consist at least partly of structural units derived from (meth)acrylate monomers—the expression, "(meth) acrylate", in agreement with the understanding of the skilled person, embraces acrylates and methacrylates. It is preferred accordingly if the (meth)acrylate block copolymers and the corresponding blocks have been produced predominantly or even substantially completely from (meth)acrylate monomers.

In the context of the present invention, the expression "poly(meth)acrylates", in agreement with the understanding of the skilled person, embraces polyacrylates and polymethacrylates and also copolymers of these polymers. Poly (meth)acrylates may contain relatively small amounts of monomer units not deriving from (meth)acrylates. A "poly (meth)acrylate" in the context of the present invention, accordingly, is a (co)polymer whose monomer basis consists to a mass fraction of 70% or more, preferably 90% or more, more preferably 98% or more, of monomers selected from the group consisting of acrylic acid, methacrylic acid, acrylic esters and methacrylic esters, based on the mass of the monomer basis. The mass fraction of acrylic ester and/or methacrylic ester is preferably 50% or more, more preferably 70% or more. Poly(meth)acrylates are accessible generally through radical polymerization of acrylic- and/or methacrylic-based monomers and also, optionally, further copolymerizable monomers.

The production of such poly(meth)acrylates from the respective monomers may take place according to the commonplace processes, in particular by conventional radical polymerizations or controlled radical polymerizations—for example, anionic polymerization or RAFT-, NMRP or ATRP polymerization. The polymers and/or oligomers may be produced by copolymerizing the monomeric components using the customary polymerization initiators and also, optionally, chain transfer agents; polymerization may take place at the customary temperatures for example in bulk, in emulsion, such as in water or liquid hydrocarbons, for example, or in solution. The poly(meth)acrylates are preferably produced by polymerization in solvents, more preferably in solvents having a boiling temperature in the range from 50 to 150° C., more preferably in the range from 60 to 120° C., using the customary amounts of polymerization initiators; the polymerization initiators are added to the monomer composition generally in a fraction of about 0.01 to 5%, more particularly of 0.1 to 2%, based on the mass of the monomer composition.

Suitable polymerization initiators are, for example, radical sources such as peroxides, hydroperoxides and azo compounds, e.g. dibenzoyl peroxide, cumene hydroperoxide, cyclohexanone peroxide, di-tert-butyl peroxide, cyclohexylsulfonyl acetyl peroxide, diisopropyl percarbonate, tert-butyl peroktoate or benzopinacol. A particularly preferred radical polymerization initiator used is 2,2'-azobis(2-methylbutyronitrile) or 2,2'-azobis(2-methylpropionitrile). Solvents suitable include, in particular, alcohols such as methanol, ethanol, n-propanol and isopropanol, n-butanol and isobutanol, preferably isopropanol and/or isobutanol, and also hydrocarbons such as toluene and, in particular, benzines having a boiling temperature in the range from 60 to 120° C. It is possible in particular to use ketones, such as acetone, methyl ethyl ketone and methylisobutyl ketone, for example, and esters, such as ethyl acetate, for example, and also mixtures of these solvents.

The (meth)acrylate block copolymers to be used in curable adhesives of the invention feature a specific polarity difference between the A blocks and the B block, this being expressed in the context of the present invention, in a customary way, via the amount-of-substance-weighted polar components of the Hansen solubility parameters $\langle\delta_p\rangle$ of the monomer units present in the A and B blocks; for the A blocks, these components must be situated in a comparatively narrow range, which, however, is in turn higher than the corresponding value for the B blocks.

The resultant (meth)acrylate block copolymers having a corresponding polarity profile are well known to the skilled person as individual components, and in particular the so-called MMA-BA-MMA block copolymers, i.e. A-B-A block copolymers with A blocks of polymethyl methacrylate and a B block of poly-n-butyl acrylate, are available commercially and are used in numerous sectors. Moreover, other representatives of these (meth)acrylate block copolymers are commercially available as well, such as, for example, MMA-BA/2-EHA-MMA block copolymers, i.e. A-B-A block copolymers with A blocks of polymethyl methacrylate and a B block of a copolymer of n-butyl acrylate and 2-ethylhexyl acrylate.

In the field of bonding technology as well, (meth)acrylate block copolymers having a corresponding polarity profile, especially MMA-BA-MMA block copolymers, are sometimes already used as additives in adhesives, where they usually take on the function of what are called impact modifiers. In spite of a potentially advantageous influence over the impact strength, however, the addition of these components is generally not seen as advantageous for the key technical adhesive properties, and in certain cases is in fact regarded as disadvantageous for said properties, and so the mass fraction of these impact modifiers is frequently minimized and usually no mass fractions of more than 20% are employed. Especially in curable adhesives, which by their nature comprise a large fraction of polymerizable compounds, especially liquid polymerizable compounds, the use of substantial amounts of (meth)acrylate block copolymers having a corresponding polarity profile is frequently accompanied by a lack of sufficient cohesion in the adhesive and/or a lack of satisfactory adaptation behaviour.

On account in particular of the fundamentally positive properties of these (meth)acrylate block copolymers having a corresponding polarity profile, this circumstance has always been perceived as being disadvantageous. It is hence particularly surprising that, as now recognized by the inventors, it is possible to obtain adhesives featuring good cohesion and an advantageous adaptation behaviour, which by virtue of the advantageous cohesion can surprisingly even be given a pressure-sensitive adhesive embodiment, through the use of a specific reactive resin which comprises solid or high-viscosity epoxide compounds in combination with liquid epoxide compounds—unexpectedly, the resulting adhesives are curable even with substantial mass fractions of these (meth)acrylate block copolymers. It was then particularly surprising that the large mass fraction of the corresponding (meth)acrylate block copolymers has no disadvantageous effects in this context, but instead produces an advantageous behaviour in the conflict of objective between cohesion and adaptation behaviour, this advantageous behaviour being synergistically combined with an advantageous shock resistance. The inventors here have found that an important part is played in particular by the embodiment of the polymer as a block copolymer, since the advantages observed, particularly in relation to the improved cohesion, are surprisingly not evident when using polymers of statistical distribution which otherwise comprise the same monomer building blocks in the same proportions. Surprisingly it has been also possible, therefore, to achieve an outstanding shock resistance, even without the use of polyols (as open-time additive), which are known to the skilled person for improving the shock properties of adhesives.

The text below now sheds light on the concept of the Hansen solubility parameters, their background and their calculation, and indicates illustrative values for those monomers regularly employed in the adhesive bonding sector.

A description of solubility parameters that is known in the literature is made using the one-dimensional Hildebrand parameter (δ). These one-dimensional δ values, however, carry errors which are frequently large in the case of polar compounds such as (meth)acrylates or compounds able to enter into hydrogen bonds, such as acrylic acid, for example. Since, therefore, the model of the one-dimensional Hildebrand solubility parameters finds only limited application, it was refined by Hansen (cf. Hansen Solubility Parameters: A Users Handbook, Second Edition; Charles M. Hansen; 2007 CRC Press; ISBN 9780849372483).

These nowadays widely employed Hansen solubility parameters are three-dimensional solubility parameters, which are frequently drawn on particularly in the field of the formulation of adhesives, as is disclosed for example in WO 2019/106194 A1 or in WO 2019/229150 A1. They consist of a dispersion component ($\delta_d$), a component arising from polar interactions ($\delta_p$) and a component for the hydrogen bonds ($\delta_H$). The relationship between the Hildebrand parameter δ and the Hansen solubility parameters is as follows:

$$\delta^2=\delta_d^2\delta_p^2+\delta_H^2$$

The values for $\delta_d$, $\delta_p$ and $\delta_H$ cannot be directly determined experimentally for poly(meth)acrylates but can be calculated via incremental systems. A common method, and one also used in the context of the present invention, is that of Stefanis/Panayiotou ("Prediction of Hansen Solubility Parameters with a New Group-Contribution Method"; Int. J. Thermophys. (2008) 29:568-585; Emmanuel Stefanis, Costas Panayiotou).

In accordance with the group-contribution method of Stefanis/Panayiotou, the Hansen solubility parameters for polymers are determined by using the protocol in the stated text to calculate the solubility parameters of those monomer units in the polymers that are attributable to the individual monomers, in other words those of the repeating unit in a polymer chain (that is, where appropriate, without the polymerizable double bond of the monomers, with account being taken instead of a covalent s-bonding as is present in the polymer chain). In this protocol, for each group in the building block, a defined value is tabulated for the dispersion component ($\delta_d$), the component of the polar interactions ($\delta_p$) the hydrogen bonding component ($\delta_H$), see "Prediction of Hansen Solubility Parameters with a New Group-Contribution Method"; Int. J. Thermophys. (2008), "Tables" 3 to 6, pages 578 to 582.

Polyacrylic acid, for example, contains the repeating unit:

$$\text{—[—}CH_2\text{—}CHC\text{—(O)OH—]}_n\text{—}$$

According to the incremental system of Stefanis/Panayiotou, the Hansen solubility parameters (one $CH_2$ group, one CH group and one COOH group) for the building block in question come out at $\delta_d$=17.7, $\delta_p$=8.6 and $\delta_H$=11.1. Polybutyl acrylate contains, for example, the repeat unit:

$$\text{—[—}CH_2\text{—}CHC(O)O(CH_2)_3CH_3\text{—]}n\text{—}$$

With four $CH_2$ groups, one CH group, one COO group and one $CH_3$ group, the Hansen solubility parameters for the building block in question come out at $\delta_d$=17.1, $\delta_p$=8.6 and $\delta_H$=6.5.

In the group-contribution method of Stefanis and Panayiotou, more complex organic molecules are described by means of what are called first-order and second-order groups. The first-order groups (n) model the fundamental molecular structure. The second-order groups (m) take account of the conjugation of the first-order groups, and increase the accuracy of the method.

For the present invention, according to the realization of the inventors, only the polar components $\delta_p$ are to be taken into account. These components can be calculated according to the following formula:

$$s_p = \left(\sum_i N_i C_i + \sum_j M_j D_j + 7.3548\right) MPa^{0.5}.$$

Tables 1 and 2 show example calculations for two illustrative compounds (epoxycyclohexylmethyl 3',4'-epoxycyclohexanecarboxylate and 2-hydroxy-3-phenoxypropyl acrylate).

TABLE 1

Calculation of the polar component of the Hansen solubility parameters, $\delta_p$ for epoxycyclohexylmethyl 3',4'-epoxycyclohexanecarboxylate.

| i | N | $1^{st}$-order group | C |
|---|---|---|---|
| 1 | 1 | COO | 3.4637 |
| 2 | 7 | —$CH_2$ | −0.3045 |
| 3 | 6 | —CH< | 0.6491 |
| 4 | 2 | O | 3.3432 |
| **j** | **M** | **$2^{nd}$-order group** | **D** |
| 1 | 2 | $C_6$ ring | −3.6437 |

Total: 11.9806 $MPa^{0.5}$

TABLE 2

Calculation of the polar component of the Hansen solubility parameter $\delta_p$ for 2-hydroxy-3-phenoxypropyl acrylate.

| i | N | $1^{st}$-order group | C |
|---|---|---|---|
| 1 | 5 | ACH | −0.5303 |
| 2 | 1 | AC | 0.6187 |
| 3 | 1 | $CH_2O$ | 0.8826 |
| 4 | 1 | —CH< | 0.6491 |
| 5 | 1 | OH | 1.1404 |
| 6 | 1 | —$CH_2$ | −0.3045 |
| 7 | 1 | COO | 3.4637 |
| 8 | 1 | $CH_2$═CH— | −2.0035 |
| **j** | **M** | **$2^{nd}$-order group** | **D** |
| 1 | 1 | AC—O—C | 0.8153 |

Total: 9.9651 $MPa^{0.5}$

The skilled person understands that the Hansen solubility parameters of the A and B blocks in the context of the present invention are calculated via the evaluation of the monomer units, i.e. of the repeating units in the polymer chain, and so relative to the monomers used for the preparation, i.e. the A monomers and the B monomers, a $CH_2$═CH— group is considered as a —$CH_2$—CH— group.

According to the stipulations of the calculation method, when using mixtures of A monomers and/or B monomers in the preparation of copolymers, a mean value of the polar component of the Hansen solubility parameters is formed, with the contributions of the individual monomers being weighted via their amount-of-substance fraction, and so the present invention considers the amount-of-substance-weighted polar components of the Hansen solubility parameters, $<\delta_p>$, which as explained above are calculated according to the group-contribution method of Stefanis and Panayiotou.

Table 3 reproduces the polar components of the Hansen solubility parameters illustratively for selected monomers which are highly relevant as basic building blocks for polymers in the field of curable adhesives.

TABLE 3

Polar components of the Hansen solubility parameters, $\delta_p$, for illustrative monomers (rounded).

| Monomer | $\delta_p/MPa^{0.5}$ |
|---|---|
| n-butyl acrylate | 8.60 |
| 2-ethylhexyl acrylate | 7.00 |
| Heptadecyl acrylate | 1.55 |
| Ethyl acrylate | 9.21 |
| Ethylene diglycol acrylates | 10.37 |
| Hydroxyethyl acrylate | 12.00 |
| Lauryl acrylate | 2.54 |
| Methoxyethyl acrylate | 10.73 |
| Methyl acrylate | 9.52 |
| 2-phenoxyethyl acrylate | 6.20 |
| 2-phenoxydiethylene glycol acrylate | 9.36 |
| Propylheptyl acrylate | 6.39 |
| Stearyl acrylate | 1.70 |
| n-octyl acrylate | 7.40 |
| Acrylic acid | 8.60 |
| Dihydrodicyclopentadienyl acrylate | 4.60 |
| Isobornyl acrylate | 6.10 |
| Tert-butyl acrylate | 9.50 |
| Methyl methacrylate | 9.31 |

In the estimation of the inventors, the focus when distinguishing the A blocks and B blocks in the context of the present invention is primarily on the different polarities, which are evaluated as described above. Nevertheless, a supplementary significance is also accorded to the glass transition temperature; on the basis of the realizations of the inventors, the limit may be regarded, as defined above, at 50° C. In the estimation of the inventors, however, it is advantageous, for the physicochemical properties to be achieved in the curable adhesive, if the A blocks used comprise hard blocks having a comparatively high glass transition temperature and the soft blocks used comprise, correspondingly, B blocks having a relatively low glass transition temperature. Preference is given to a curable adhesive of the invention wherein the A blocks independently of one another are a poly(meth)acrylate having a glass transition temperature Tg of more than 60° C., preferably more than 70° C., more preferably more than 80° C., and/or wherein the B block is a poly(meth)acrylate having a glass transition temperature Tg of less than 40° C., preferably less than 30° C., more preferably less than 20° C.

As elucidated above, it is not absolutely necessary, and nor is it to be expected in the light of the typical variance in the preparation of polymers, that the A blocks in each (meth)acrylate block copolymer are identical, so that the above definition ultimately defines only a minimal or maximal glass transition temperature and also the chemical nature of the monomeric units in the respective (co)polymers. The skilled person, however, understands that with a view in particular to manufacturing aspects, and also in relation to the homogeneity of the physicochemical properties of the curable adhesive producible therewith, preferred (meth)acrylate block copolymers are those in which the A blocks are as far as possible similar; it is deemed to be particularly advantageous if the A blocks are prepared such that, within the bounds of the typical variance in polymer chemistry, they are substantially identical or exhibit a low polydispersity. In agreement with the understanding of the skilled person, particularly effective (meth)acrylate block copolymers result, if the A blocks are prepared under identical polymerization conditions from the same A monomer composition. Against this background, a preferred curable adhesive of the invention is one where the two A blocks are poly(meth)acrylates whose glass transition temperature differs by less than 5° C., preferably by less than 3° C., more preferably by less than 1° C., with the poly(meth)acrylates being preparable by polymerization of the same A monomer composition from A monomers, with the A blocks being preferably substantially identical.

Although the use of copolymers in the A and B blocks is conceivable in principle, potentially also with at least small fractions of monomers which are not (meth)acrylate-based monomers, it is preferable in the estimation of the inventors, for the great majority of cases, if the A or B blocks respectively are as far as possible largely (meth)acrylate-based and accordingly consist very preferably substantially of one type of (meth)acrylate-based monomers. Preference is therefore given to a curable adhesive of the invention wherein the A monomers comprise one or more monomers, preferably one monomer, which are selected from the group consisting of (meth)acrylate monomers and (meth)acrylic acid, preferably methacrylate monomers, where the A monomers consist preferably to an extent of 90% or more, more preferably to an extent of 95% or more, very preferably to an extent of 99% or more, most preferably substantially completely, of these monomers, based on the combined mass of the A monomers. Preference is likewise given to a curable adhesive of the invention wherein the B monomers comprise one or more monomers, preferably one monomer, which are selected from the group consisting of (meth) acrylate monomers and (meth)acrylic acid, preferably acrylate monomers and acrylic acid, more preferably acrylate monomers, where the B monomers consist preferably to an extent of 90% or more, more preferably to an extent of 95% or more, very preferably to an extent of 99% or more, most preferably substantially completely, of these monomers, based on the combined mass of the B monomers. Accordingly it is particularly preferred if the above features for the A monomers and B monomers are established in the same way and/or with the same degree of preference, it being especially preferred if the respective monomers are each formed substantially completely of a corresponding monomer of the specified types. The corresponding (meth)acrylate block copolymers in this case not only result in excellent cohesion in the curable adhesives but also in particular can be produced with particular ease, reliability and reproducibly, and so in particular it is possible to reduce the cost and complexity of storage and it is easier to establish a consistent product quality.

On the basis of the observations above, the inventors have succeeded in identifying particularly suitable monomers for the A monomers and the B monomers and hence for the chemical nature of the A and B blocks, these monomers resulting, in the estimation of the inventors, in particular highly performing curable adhesives of the invention, with the observations above applying correspondingly to the formation of the A and B blocks as largely pure polymers. Preference is given, indeed, to a curable adhesive of the invention wherein the A monomer composition comprises one or more A monomers which are selected from the group consisting of methyl methacrylate, ethyl acrylate, methyl acrylate, 2-phenoxydiethylene glycol acrylate and tert-butyl acrylate, preferably consisting of methyl methacrylate and ethyl acrylate, more preferably methyl methacrylate, and/or wherein the A monomer composition comprises methyl methacrylate in a mass fraction of 80% or more, preferably of 90% or more, more preferably of 95% or more, very preferably of 98% or more, especially preferably of 99% or more, more preferably of substantially 100%, based on the mass of the A monomer composition, and/or wherein the A blocks independently of one another stand for a polymethyl methacrylate. Preference is given, additionally or alternatively, to a curable adhesive of the invention wherein the B monomer composition comprises one or more B monomers which are selected from the group consisting of n-butyl acrylate, 2-ethylhexyl acrylate, n-octyl acrylate, isobornyl acrylate, 2-phenoxyethyl acrylate, propylheptyl acrylate and acrylic acid, preferably consisting of n-butyl acrylate, 2-phenoxyethyl acrylate and 2-ethylhexyl acrylate, more preferably consisting of n-butyl acrylate and 2-ethylhexyl acrylate, very preferably n-butyl acrylate, and/or wherein the B monomer composition comprises n-butyl acrylate and/or 2-ethylhexyl acrylate, preferably n-butyl acrylate, in a combined mass fraction of 80% or more, preferably of 90% or more, more preferably of 95% or more, very preferably of 98% or more, especially preferably of 99% or more, most preferably of substantially 100%, based on the mass of the B monomer composition, and/or wherein the B block is a poly-n-butyl acrylate.

The number-average molecular weights $M_n$ of the (meth) acrylate block copolymers are preferably in a range of 20,000 to 1,000,000 g/mol, more preferably in a range of 90,000 to 500 000 g/mol, very preferably in a range from 105,000 to 150 000 g/mol. The weight-average molecular weight $M_w$ of the (meth)acrylate block copolymers are preferably in in a range from 20 000 to 1,000,000 g/mol, more preferably in a range from 100 000 to 500 000 g/mol, very preferably in a range from 115,000 to 150 000 g/mol. The inventors have surprisingly determined that the shock resistance can be improved by using relatively high molecular weight (meth)acrylate block copolymers in the adhesives of the invention. Great preference is given to (meth)acrylate block copolymers whose number-average molecular weights $M_n$ are in a range from 105,000 to 150 000 g/mol and whose weight-average molecular weights $M_w$ are in a range from 115,000 to 150 000 g/mol. Particularly advantageous in this context are (meth)acrylate block copolymers having an A block or poly(meth)acrylate fraction of below 20%.

These statements of the number-average molar mass $M_n$ and of the weight-average molecular weights $M_w$ are based on the determination by gel permeation chromatography (GPC). The determination is made on 100 μl of clear-filtered sample (sample concentration 4 g/l). The eluent used is tetrahydrofuran with 0.1 vol % of trifluoroacetic acid. The measurement takes place at 25° C. The pre-column used is a PSS-SDV-type column, 5 μm, $10^3$ Å, 8.0 mm*50 mm (data here and below in the following order: type, particle size, porosity, internal diameter*length; 1 Å=$10^{10}$ m). Separation takes place using a combination of the PSS-SDV-type columns 5 μm, $10^3$ Å and also $10^5$ Å and $10^6$ Å each with 8.0 mm*300 mm (columns from Polymer Standards Service). Alternatively to this it is possible to use (two) columns of the PLgel 5 μm MIXDED-D type from Agilent. Detection is accomplished by Shodex R171 differential refractometer. The flow rate is 1.0 ml per minute. Calibration takes place against PS standards (polystyrene calibration).

As part of the development of the invention, the inventors have succeeded, for the absolute polar components of the Hansen solubility parameter of the A monomers and of the B monomers, in identifying particularly suitable ranges with which particularly highly performing curable adhesives can be realized; in particular, it has also been identified as advantageous if the polarity of the B block does not differ too greatly from that of the A blocks. The range indications identified accordingly are, in the estimation of the inventors, particularly useful for rapid and reliable design of new (meth)acrylate block copolymers for the respective applications, since the corresponding polar components of the Hansen solubility parameters can be looked up from tabulated values, for example, against the background of this disclosure. Initially preferred accordingly is a curable adhesive of the invention, wherein the amount-of-substance-weighted polar component of the Hansen solubility parameters $<\delta_p>$ of the monomer units derived from A monomers in the A blocks, $<\delta_p>(A)$, is in the range from 9.1 to 10.0 $MPa^{0.5}$, preferably in the range from 9.2 to 9.5 $MPa^{0.5}$, more preferably in the range from 9.3 to 9.4 $MPa^{0.5}$. Preference is given furthermore, additionally or alternatively, to a curable adhesive of the invention wherein the amount-of-substance-weighted polar component of the Hansen solubility parameters $<\delta_p>$ of the monomer units derived from B monomers in the B blocks, $<\delta_p>(B)$, is in the range from 6.0 to 8.9 $MPa^{0.5}$ preferably in the range from 6.5 to 8.8 $MPa^{0.5}$, more preferably in the range from 7.0 to 8.7 $MPa^{0.5}$, and/or wherein the amount-of-substance-weighted polar component of the Hansen solubility parameters $<\delta_p>$ of the monomer units derived from B monomers in the B blocks, $<\delta_p>(B)$, is more than 6 $MPa^{0.5}$, preferably more than 7 $MPa^{0.5}$, more preferably more than 8 $MPa^{0.5}$. In the estimation of the inventors, accordingly, it is especially advantageous if the distance in the polarity lies within a defined, relatively narrow range. A preferred curable adhesive of the invention, accordingly, is one where the difference $<\delta_p>(A)-<\delta_p>(B)$ is in the range from 0.2 to 2.0 $MPa^{0.5}$ preferably in the range from 0.4 to 1.5 $MPa^{0.5}$, more preferably in the range from 0.6 to 1.0 $MPa^{0.5}$.

The curable adhesive of the invention also comprises, further to the (meth)acrylate block copolymer, at least two different polymerizable epoxide compounds, these being at least one first epoxide compound E1 and at least one second epoxide compound E2, and also optionally further polymerizable compounds. These compounds together form that part of the curable adhesive that is frequently referred to by the skilled person as reactive resin.

In this context and in agreement with the understanding of the skilled person, the expression "polymerizable" relates to the capacity of these compounds, possibly after suitable activation, to enter into a polymerization reaction. In the case of the polymerizable epoxide compounds, the polymerizability is made possible, for example, by the epoxide groups. The polymerizability may also come from the fact that there are two or more polymerizable compounds present which are jointly polymerizable, by a polyaddition or a polycondensation, for example. In that case, an illustrative instance would be the combination of epoxide compounds with dicyandiamide and/or imidazoles.

In agreement with the understanding of skilled person, epoxide compounds are compounds which carry at least one oxirane group. They may be aromatic or aliphatic, more particularly cycloaliphatic, in nature. Polymerizable epoxide compounds may comprise not only monomeric but also oligomeric or polymeric epoxide compounds. Polymerizable epoxide compounds frequently have on average at least two epoxide groups per molecule, preferably more than two epoxide groups per molecule. Preferred accordingly is a curable adhesive of the invention wherein the one or the two or more first epoxide compounds E1 and/or the one or the two or more second epoxide compounds E2, preferably the first epoxide compounds E1 and second epoxide compounds E2, are selected from the group consisting of epoxide compounds having two or more epoxide groups, preferably two epoxide groups.

The oligomeric or polymeric epoxide compounds comprise mostly linear polymers having terminal epoxide groups (e.g. a diglycidyl ether of a polyoxyalkylene glycol), polymers having skeletal oxirane units (e.g. polybutadiene polyepoxide), and polymers having epoxide side groups (e.g. a glycidyl methacrylate polymer or copolymer). The molecular weight of such epoxide compounds may vary from 58 to about 100 000 g/mol or more, with the molecular weight being an important parameter for adjusting the dynamic viscosity. Illustrative polymerizable epoxide compounds include epoxycyclohexanecarboxylates, such as, for example, 4-epoxycyclohexylmethyl 3,4-epoxycyclohexanecarboxylate, 3,4-epoxy-2-methylcyclohexylmethyl 3,4-epoxy-2-methylcyclohexanecarboxylate and bis(3,4-epoxy-6-methylcyclohexylmethyl) adipate. Further examples of polymerizable epoxide compounds are disclosed in U.S. Pat. No. 3,117,099 A, for example. Further polymerizable epoxide compounds which are particularly useful in the application of this invention include glycidyl ether monomers, as are disclosed for example in U.S. Pat. No. 3,018,262. Examples are the glycidyl ethers of polyhydric phenols, which are obtained by reaction of a polyhydric phenol with an excess of chlorohydrin, such as epichlorohydrin (e.g. the diglycidyl ether of 2,2-bis-(2,3-epoxypropoxyphenol)propane). More particularly, diglycidyl ethers of bisphenols, such as bisphenol-A (4,4'-(propane-2,2-diyl)diphenol) and bisphenol-F (bis(4-hydroxyphenyl)methane). Such reaction products are available commercially in different molecular weights and physical states (for example so-called type 1 to type 10 BADGE resins). Typical examples of liquid bisphenol A diglycidyl ethers are Epikote 828, D.E.R.331 and Epon 828. Typical solid BADGE resins are Araldite GT 6071, GT 7072, Epon 1001 and D.E.R. 662. Further reaction products of phenols with epichlorohydrin are the phenol and cresol novolac resins such as the Epiclon products or Araldite EPN and ECN products (e.g. ECN1273).

Building on the observations above, the inventors have succeeded in identifying polymerizable epoxide compounds with which particularly good results are achievable when resolving the conflict of objective between cohesion and adaptation behaviour. Preferred accordingly is a durable adhesive of the invention wherein the one or the two or more first epoxide compounds E1 and/or the one or the two or more second epoxide compounds E2, preferably the first epoxide compounds E1 and the second epoxide compounds E2, are selected from the group consisting of epoxide compounds having at least one cycloaliphatic group, more particularly a cyclohexyl group or dicyclopentadienyl group, and/or wherein the curable adhesive comprises at least one first epoxide compound E1 and/or at least one second epoxide compound E2, preferably at least one first epoxide compound E1 and at least one second epoxide compound E2, which are selected from the group consisting of epoxide compounds having at least one cycloaliphatic group, more particularly a cyclohexyl group or dicyclopentadienyl group. Preferred additionally or alternatively is a curable adhesive of the invention wherein the one or the two or more first epoxide compounds E1 and/or the one or the two or more second epoxide compounds E2, preferably the first epoxide compounds E1 and die second epoxide compounds E2, are selected from the group consisting of bisphenol A diglycidyl ethers and bisphenol F diglycidyl ethers, preferably bisphenol A diglycidyl ethers, and/or wherein the curable adhesive comprises at least one first epoxide compound E1 and/or at least one second epoxide compound E2, preferably at least one first epoxide compound E1 and at least one the second epoxide compound E2, which are selected from the group consisting of bisphenol A diglycidyl ethers and bisphenol F diglycidyl ethers, preferably bisphenol A diglycidyl ethers.

It is especially preferred accordingly if the two above described features of the epoxide compounds are combined in so far as epoxide compounds having at least one cycloaliphatic group are obtained by hydrogenation of corresponding bisphenol compounds, since especially when using at least one such epoxide compound, particularly as a liquid epoxide compound, curable adhesives are obtained which achieve the above-described objects particularly well. Here the inventors have surprisingly determined that hydrogenated epoxide compounds of these kinds have relatively high bond strengths. Particularly preferred accordingly is a curable adhesive of the invention wherein the one or the two or more first epoxide compounds E1 and/or the one or the two or more second epoxide compounds E2, preferably the second epoxide compounds E2, are selected from the group consisting of hydrogenated bisphenol A diglycidyl ethers and hydrogenated bisphenol F diglycidyl ethers, preferably hydrogenated bisphenol A diglycidyl ethers, and/or wherein the curable adhesive comprises at least one first epoxide compound E1 and/or at least one second epoxide compound E2, preferably at least one second epoxide compound E2, which are selected from the group consisting of hydrogenated bisphenol A diglycidyl ethers and hydrogenated bisphenol F diglycidyl ethers, preferably hydrogenated bisphenol A diglycidyl ethers.

The first polymerizable epoxide compounds E1 are selected from the group consisting of compounds which at 25° C. are solids or high-viscosity substances, the latter being defined in the context of the present invention via a lower dynamic viscosity limit at 25° C. The skilled person understands accordingly that the distinction between solids and corresponding high-viscosity substances is useful in practice for the application because the viscosity of solids is intrinsically multiple powers of ten above the above-indicated value of the dynamic viscosity, but in practice is frequently barely worth determining, it being sufficient accordingly to determine that it is a solid. Through the chosen definition, advantageously, there is also no need to distinguish whether a substance at 25° C. is a solid or a high-viscosity substance having a corresponding dynamic viscosity. In contrast, the second polymerizable epoxide compounds E2 are low-viscosity liquids, which in the context of the present invention are defined via an upper dynamic viscosity limit at 25° C. For the purposes of the present invention this dynamic viscosity is determined in accordance with DIN 53019-1 from 2008 at 25° C. and with a shear rate of 1 $s^{-1}$.

The inventors here have recognized that it is particularly advantageous if the difference chosen for the viscosities between the polymerizable epoxide compounds is relatively large. Preference is therefore given to a curable adhesive of the invention wherein at least one, preferably all, of the first epoxide compounds E1 at 25° C. have a dynamic viscosity of 100 Pa s or more, preferably of 150 Pa s or more, and/or wherein at least one, preferably all, of the second epoxide compounds E2 at 25° C. have a dynamic viscosity of 30 Pa s or less, preferably 20 Pa s or less, very preferably 10 Pa s or less. In this case with particular preference the corresponding preferred ranges are combined with one another.

From the observations above it also follows that the use of solid epoxide compounds as first epoxide compound E1 is particularly preferred on account of the resultant large discrepancy in the dynamic viscosity. Particular preference is therefore given to a curable adhesive of the invention wherein the one or the two or more first epoxide compounds E1 is or a solid having a softening temperature of 45° C. or more, and/or wherein at least one, preferably all, of the first epoxide compounds E1 is or are a solid having a softening temperature of 45° C. or more.

It may be seen as an advantage of the curable adhesives of the invention that in terms of the nature of the curing, particularly the choice of the catalysts, they are very flexible. The skilled person tailors the catalyst system used for curing substantially to the application requirements and to the polymerizable compounds used. Accordingly, for the majority of relevant applications, it will be conducive in practice if the curable adhesive of the invention already further comprises one or more initiators.

With a view to the later handling properties, it is particularly advantageous, in the estimation of the inventors, to use radiation-crosslinking and/or thermally crosslinking systems, radiative activation has great handling-related advantages in particular. Preference is given accordingly to a curable adhesive of the invention wherein the curable adhesive is a radiation-curing and/or thermally curing adhesive, and/or wherein the curable adhesive is curable by polymerization of the first epoxide compounds E1 and of the second epoxide compounds E2, preferably by radiative activation and/or thermal activation.

Preferred in principle accordingly is a curable adhesive of the invention wherein the curable adhesive comprises one or more initiators, preferably in a combined mass fraction in the range from 0.05 to 4%, preferably in the range from 0.1 to 3%, based on the mass of the curable adhesive, and/or wherein the one or the two or more initiators are preferably selected from the group consisting of radiation-activated initiators and thermally activated initiators.

In the case of the presently envisaged use of polymerizable epoxide compounds in the reactive resin, the polymerization takes place preferably by means of cationic polymerization. Preference is therefore given to a curable adhesive of the invention wherein the one or the two or more initiators are selected from the group consisting of radiation-activated initiators and thermally activated initiators. Preference is therefore also given to a curable adhesive of the invention wherein the one or the two or more initiators are selected from the group consisting of initiators for the cationic polymerization. Particularly preferred in the combination, therefore, is a curable adhesive of the invention wherein the one or the two or more initiators are selected from the group consisting of radiation-activated initiators for cationic polymerization, an example being triarylsulfonium hexafluoroantimonate.

For the thermal curing it is usual to use what are called curing agents and accelerators. In the context of the invention, the expression "curing agent" here refers in accordance with DIN 55945: 1999-07 to the chemical compounds—acting as binders—which are added to the polymerizable compounds in order to bring about the crosslinking of the curable adhesive. The curing agent brings about the chemical crosslinking, correspondingly, with the accelerators, in the presence of a curing agent, increasing the reaction rate in the curing reaction and/or the rate of activation of the curing of the epoxy resins. Curing reactions can be identified fundamentally as a peak in dynamic scanning calorimetry (DSC). Compounds understood as accelerators are in particular those compounds whose addition shifts the curing peak of a particular curing agent towards lower temperatures. The entirety of curing agent and accelerator is also referred to by the skilled person as the curing reagent.

The lists of the substances which can be used as curing agents and accelerators overlap one another, with the individual representatives in some cases also being able to take on both functions at one and the same time; accordingly, the transition between curing agent and accelerator is generally a fluid one, with the selection of a suitable system of curing agent and accelerator posing no great challenges to the skilled person. As curing agents and/or accelerators it is possible, for example, to use compounds selected from the group consisting of dicyandiamides, imidazoles, anhydrides, epoxy-amine adducts, hydrazides, and reaction products of diacids and polyfunctional amines. Examples of reaction products of diacids and polyfunctional amines that are contemplated include reaction products of phthalic acid and diethylenetriamine. Stochiometric curing agents such as dicyandiamide, for example, are used preferably based on the amount of epoxide in the adhesive. Non-stochiometric curing agents such as imidazoles and epoxy-amine adducts, for example, are used typically in fractions of up to 20%, based on the epoxide fraction.

Useful initiators for a cationic UV-induced curing of epoxide compounds are, in particular, sulfonium-, iodonium- and metallocene-based systems. For examples of sulfonium-based cations, reference may be made to the observations in U.S. Pat. No. 6,908,722 B1. Examples of anions which serve as counterions for the above-stated cations include tetrafluoroborate, tetraphenylborate, hexafluorophosphate, perchlorate, tetrachloroferrate, hexafluoroarsenate, hexafluoroantimonate, pentafluorohydroxyantimonate, hexachloroantimonate, tetrakispentafluorophenylborate, tetrakis(pentafluoromethylphenyl)borate, bi(trifluoromethylsulfonyl)amides and tris(trifluoromethylsulfonyl)methides. Also conceivable, moreover, especially for iodonium-based initiators, are chloride, bromide or iodide anions, although initiators which are substantially free from chlorine and bromine are preferred. A high-performance example of such a system is, for example, triphenylsulfonium hexafluoroantimonate. Further suitable initiators are disclosed for example in U.S. Pat. Nos. 3,729,313 A, 3,741,769 A, 4,250,053 A, 4,394,403 A, 4,231,951 A, 4,256,828 A, 4,058,401 A, 4,138,255 A and US 2010/063221 A1.

Specific examples of sulfonium salts which can be used are triphenylsulfonium hexafluoroarsenate, triphenylsulfonium hexafluoroborate, triphenylsulfonium tetrafluoroborate, triphenylsulfonium tetrakis(pentafluorobenzyl)borate, methyldiphenylsulfonium tetrafluoroborate, methyldiphenylsulfonium tetrakis(pentafluorobenzyl)borate, dimethylphenylsulfonium hexafluorophosphate, triphenylsulfonium hexafluorophosphate, triphenylsulfonium hexafluoroantimonate, diphenylnaphthylsulfonium hexafluoroarsenate, tritolylsulfonium hexafluorophosphate, anisyldiphenylsulfonium hexafluoroantimonate, 4-butoxyphenyldiphenylsulfonium tetrafluoroborate, 4-chlorophenyldiphenylsulfonium hexafluoroantimonate, tris(4-phenoxyphenyl)sulfonium hexafluorophosphate, di-(4-ethoxyphenyl)methylsulfonium hexafluoroarsenate, 4-acetylphenyldiphenylsulfonium tetrafluoroborate, 4-acetylphenyldiphenylsulfonium tetrakis(pentafluorobenzyl)borate, tris(4-thiomethoxyphenyl)sulfonium hexafluorophosphate, di(methoxysulfonylphenyl)methylsulfonium hexafluoroantimonate, di(methoxynaphthyl)methylsulfonium tetrafluoroborate, di-(methoxynaphthyl)methylsulfonium tetrakis(pentafluorobenzyl)borate, di(carbomethoxyphenyl)methylsulfonium hexafluorophosphate, (4-octyloxyphenyl)diphenylsulfonium tetrakis(3,5-bistrifluoromethylphenyl)borate, tris[4-(4-acetylphenyl)thiophenyl]sulfonium tetrakis(pentafluorophenyl)borate, tris(dodecylphenyl)sulfonium tetrakis(3,5-bis-trifluoromethylphenyl)borate, 4-acetamidophenyldiphenylsulfonium tetrafluoroborate, 4-acetamidophenyldiphenylsulfonium tetrakis(pentafluorobenzyl)borate, dimethylnaphthylsulfonium hexafluorophosphate, trifluoromethyldiphenylsulfonium tetrafluoroborate, trifluoromethyldiphenylsulfonium tetrakis(pentafluorobenzyl)borate, phenylmethylbenzylsulfonium hexafluorophosphate, 5-methylthianthrenium hexafluorophosphate, 10-phenyl-9,9-dimethylthioxanthenium hexafluorophosphate, 10-phenyl-9-oxothioxanthenium tetrafluoroborate, 10-phenyl-9-oxothioxanthenium tetrakis(pentafluorobenzyl)borate, 5-methyl-10-oxothianthrenium tetrafluoroborate, 5-methyl-10-oxothianthrenium tetrakis(pentafluorobenzyl)borate and 5-methyl-10,10-dioxothianthrenium hexafluorophosphate.

Specific examples of iodonium salts which can be used are diphenyliodonium tetrafluoroborate, di(4-methylphenyl)iodonium tetrafluoroborate, phenyl-4-methylphenyliodonium tetrafluoroborate, di(4-chlorophenyl)iodonium hexafluorophosphate, dinaphthyliodonium tetrafluoroborate, di(4-trifluoromethylphenyl)iodonium tetrafluoroborate, diphenyliodonium hexafluorophosphate, di(4-methylphenyl)iodonium hexafluorophosphate, diphenyliodonium hexafluoroarsenate, di(4-phenoxyphenyl)iodonium tetrafluoroborate, phenyl-2-thienyliodonium hexafluorophosphate, 3,5-dimethylpyrazolyl-4-phenyliodonium hexafluorophosphate, diphenyliodonium hexafluoroantimonate, 2,2'-diphenyliodonium tetrafluoroborate, di-(2,4-dichlorophenyl)iodonium hexafluorophosphate, di(4-bromophenyl)iodonium hexafluorophosphate, di(4-methoxyphenyl)iodonium hexafluorophosphate, di(3-carboxyphenyl)iodonium hexafluorophosphate, di(3-methoxycarbonylphenyl)iodonium hexafluorophosphate, di(3-methoxysulfonylphenyl)iodonium hexafluorophosphate, di(4-acetamidophenyl)iodonium hexafluorophosphate, di(2-benzothienyl)iodonium hexafluorophosphate, diaryliodonium tristrifluoromethylsulfonylmethide and diphenyliodonium hexafluoroantimonate, diaryliodonium tetrakis(pentafluorophenyl)borate such as diphenyliodonium tetrakis(pentafluorophenyl)borate, [4-(2-hydroxy-n-tetradesiloxy)phenyl]phenyliodonium hexafluoroantimonate, [4-(2-hydroxy-n-tetradesiloxy)phenyl]phenyliodonium trifluorosulfonate, [4-(2-hydroxy-n-tetradesiloxy)phenyl]phenyliodonium hexafluorophosphate, [4-(2-hydroxy-n-tetradesiloxy)phenyl]phenyliodonium tetrakis(pentafluorophenyl)borate, bis(4-tert-butylphenyl)iodonium hexafluoroantimonate, bis-(4-tert-butylphenyl)iodonium hexafluorophosphate, bis(4-tert-butylphenyl)iodonium trifluorosulfonate, bis(4-tert-butylphenyl)iodonium tetrafluoroborate, bis(dodecylphenyl)iodonium hexafluoroantimonate, bis(dodecylphenyl)iodonium tetrafluoroborate, bis(dodecylphenyl)iodonium hexafluorophosphate, bis(dodecylphenyl)iodonium trifluoromethylsulfonate, di(dodecylphenyl)iodonium hexafluoroantimonate, di(dodecylphenyl)iodonium triflate, diphenyliodonium bisulfate, 4,4'-dichlorodiphenyliodonium bisulfate, 4,4'-dibromodiphenyliodonium bisulfate, 3,3'-dinitrodiphenyliodonium bisulfate, 4,4'-dimethyldiphenyliodonium bisulfate, 4,4'-bis-succinimidodiphenyliodonium bisulfate, 3-nitrodiphenyliodonium bisulfate, 4,4'-dimethoxydiphenyliodonium bisulfate, bis(dodecylphenyl)iodonium tetrakis(pentafluorophenyl)borate, (4-octyloxyphenyl)phenyliodonium tetrakis(3,5-bis-trifluoromethylphenyl)borate and (tolylcumyl)iodonium tetrakis(pentafluorophenyl)borate, and ferrocenium salts (see, for example, EP 0 542 716 B1) such as η5-(2,4-cyclopentadiene-1-yl)[(1,2,3,4,5,6,9)(1-methylethyl)benzene]iron.

Photoinitiators are used typically individually or as a combination of two or more photoinitiators. When using photoinitiators, combinations with so-called sensitizers are very helpful for adapting the activation wavelength of the photoinitiation system to the chosen emission spectrum; for this purpose, reference is made to the literature known to the skilled person, such as "Industrial Photoinitiators: A technical guide", 2010, by A. W. Green. Typically in these cases the mass fraction of photoinitiators in the curable adhesive is not more than 4% but at least 0.1%, and is preferably in the range from 0.5 to 2%. The mass fraction of sensitizers is customarily not more than 3% and is preferably in the range from 0.5 to 2%.

For the components to be used in curable adhesives of the invention, the inventors have succeeded in identifying particularly favourable mass fractions which, when implemented, enable the acquisition of particularly highly performing curable adhesives, it being particularly surprising that even relatively large amounts of (meth)acrylate block copolymer have advantageous consequences for the bonding properties. Preferred accordingly is a curable adhesive of the invention wherein the combined mass fraction of the (meth) acrylate block copolymers in the curable adhesive is 28% or more, preferably 30% or more, more preferably 33% or more, and/or wherein the combined mass fraction of the (meth)acrylate block copolymers in the curable adhesive is in the range from 28 to 80%, preferably in the range from 30 to 65%, more preferably in the range from 33 to 55%. Preferred additionally or alternatively is a curable adhesive of the invention wherein the combined mass fraction of the first epoxide compounds E1 in the curable adhesive is 10% or more, preferably 15% or more, more preferably 20% or more, and/or wherein the combined mass fraction of the first epoxide compounds E1 in the curable adhesive is in the range from 5 to 50%, preferably in the range from 10 to 40%, more preferably in the range from 15 to 30%. Likewise preferred additionally or alternatively is a curable adhesive of the invention wherein the combined mass fraction of the second epoxide compounds E2 in the curable adhesive is 10% or more, preferably 20% or more, more preferably 30% or more, and/or wherein the combined mass fraction of the second epoxide compounds E2 in the curable adhesive is in the range from 10 to 60%, preferably in the range from 20 to 55%, more preferably in the range from 30 to 45%. In this context it is particularly preferred if for two or three of the components, preferably for three of the components, the equally preferred ranges are established.

The curing rate or the open time of the curable adhesives of the invention may be adjusted by addition of open time additives. The curable adhesives of the invention preferably have open times of at least one minute, or else of at least three minutes, more particularly at least five minutes. In general the combined mass fraction of the open time additives here is in the range from 0 to 15%, preferably in the range from 0 to 10%. Employed typically as open time additive are polyalcohols (polyols), which have two or more free hydroxyl functions, such as polyethylene glycol 400 (PEG 400), referred to below as "polyol open time additive". However, there are also other known kinds of open time additives (referred to below as "non-polyol open time additive") or open time additives without free hydroxyl functions. These include, for example, polyethylene glycol dimethyl ether 500. The retarding effect of the ether groups on the curing is comparable with that of the polyethylene glycol polyol, which, however, because of the methyl groups at the start and end, is not a polyol which can be incorporated intro the network and therefore increases the elasticity of the epoxide network. Other non-polyol open time additives are known to the skilled person from WO 02/61010 A2, EP 276 716 A2 and EP 661 324 A1, for example, and may also be used.

The inventors have surprisingly determined that curable adhesives of the invention which comprise a combined mass fraction of less than 0.9% of polyol open time additive or else comprise no polyol open time additive (i.e. combined mass fraction of less than 0.001%) and are therefore free from a polyol open time additive also exhibit excellent shock resistance. Curable adhesives of the invention therefore preferably comprise a combined mass fraction of less than 0.9% of polyol open time additive or else no polyol open time additive (i.e. combined mass fraction of less than 0.001%). For further increasing the shock resistance, non-polyol open time additives are suitable, such as polyethylene glycol dimethyl ether 500, for example. In the case of these, the retarding effect of the ether groups on curing is comparable with that of polyol open-time additives; however, because of the methyl groups at the start and end, the compounds in question are not a polyol which is incorporated into the polymer network and therefore increases the elasticity of the epoxide network. Particularly preferred are curable adhesives of the invention which comprise a non-polyol open time additive in a combined mass fraction in the range from 0.5 to 15%.

Particularly preferred additionally or alternatively is a curable adhesive of the invention wherein the combined mass fraction of the second epoxide compounds E2 is greater than the combined mass fraction of the first epoxide compounds E1. The inventors have surprisingly determined that a higher amount of the solid or high-viscosity first epoxide compound E1 is not necessary for attainment of sufficient cohesion (initially before curing). Inadequate amounts of solid epoxy resins frequently result in "sludgy" adhesives, which tend to fail cohesively. In this case there was, surprisingly, no such observation, and therefore preferably the combined mass fraction of the first epoxide compounds E1 in the curable adhesive is not more than 30%, more preferably not more than 25% and/or the combined mass fraction of the first epoxide compounds E1 in the curable adhesive is in the range from 15 to 30%, more preferably in the range from 20 to 25%. In this case, the combined mass fraction of the second epoxide compounds E2 in the curable adhesive is 10% or more, and/or the combined mass fraction of the second epoxide compounds E2 in the curable adhesive is in the range from 10 to 60%, more preferably in the range from 30 to 50%.

Particularly advantageous curable adhesives are obtained if the adhesive is formed in large parts of the components recited above. Preferred, consequently, is a curable adhesive of the invention wherein the combined mass fraction of the (meth)acrylate block copolymers, of the first epoxide compounds E1 and of the second epoxide compounds E2 in the curable adhesive is 80% or more, preferably 90% or more, more preferably 95% or more.

Beyond the absolute mass fractions, the inventors have also been able to identify relative mass proportions of the respective components that result in advantageous curable adhesives. Preferred accordingly is a curable adhesive of the invention wherein the ratio of the combined mass of the (meth)acrylate block copolymers to the combined mass of the first epoxide compounds E1 and of the second epoxide compounds E2 in the curable adhesive is in the range from 0.35:1 to 4:1, preferably in the range from 0.40:1 to 2:1, more preferably in the range from 0.45:1 to 1.2:1. Preferred additionally or alternatively is also a curable adhesive of the invention wherein the ratio of the combined mass of the first epoxide compounds E1 to the combined mass of the second epoxide compounds E2 in the curable adhesive is in the range from 1:10 to 10:1, preferably in the range from 1:5 to 2:1, more preferably in the range from 1:3 to 1:1. Particularly preferred additionally or alternatively to this is a curable adhesive of the invention wherein the combined mass of the second epoxide compounds E2 is greater than the combined mass of the first epoxide compounds E1. In this case, the ratio of the combined mass of the first epoxide compounds E1 to the combined mass of the second epoxide compounds E2 in the curable adhesive is in the range from 1:1.5 to 1:2.5; most preferably the ratio of the combined mass of the first epoxide compounds E1 to the combined mass of the second epoxide compounds E2 is 1:2.

Lastly it may be seen as an advantage of curable adhesives of the invention that in terms of the use of typical additives they are very flexible, and so the physicochemical properties can be further tailored to the requirements of the particular end use. Preference is therefore given to a curable adhesive wherein the curable adhesive comprises one or more further additives, preferably in a combined mass fraction in the range from 0.1 to 50%, preferably 0.2 to 40%, based on the mass of the adhesive, and/or wherein the one or the two or more further additives are preferably selected from the group consisting of tackifier resins, ageing inhibitors, light stabilizers, UV absorbers and rheological additives.

A particular case of the further components which serve to adjust the properties of adhesives are insoluble fillers, which may be added to the curable adhesive in order to obtain a filled curable adhesive. These insoluble fillers are particulate fillers having a mean particle diameter (D50) of 5 μm or more, preferably 10 μm or more, more preferably 20 μm or more, which are not soluble in the curable adhesive and which are present therein accordingly as a dispersion, and also macroscopic fillers such as fibres, for example. The insoluble fillers are preferably selected from the group consisting of particulate fillers. More preferably the insoluble fillers are selected from the group consisting of expandable hollow polymer spheres, non-expandable hollow polymer spheres, solid polymer spheres, hollow glass spheres, solid glass spheres, hollow ceramic spheres, solid ceramic spheres and/or solid carbon spheres. Also suitable as insoluble fillers, for example, are fibres, laid scrims, platelets and rodlets of materials insoluble in the curable adhesive. Because of their in some cases already macroscopic dimensions and the lack of solubility, these fillers essentially have no influence on the above-disclosed relationships of the compositional chemistry of the curable adhesives, instead being present as a heterogeneous mixture with the curable adhesive. Correspondingly, in the context of the present invention, these insoluble fillers are not counted as part of the curable adhesive, and are disregarded accordingly when calculating mass fractions relative to the mass of the curable adhesive. As described above, the definition in the context of the present invention is instead that the addition of insoluble fillers to a curable adhesive of the invention results in a filled curable adhesive, i.e. a filled curable adhesive comprising:

x) a curable adhesive of the invention, preferably as disclosed above as being preferred, and y) one or more insoluble fillers.

More preferably the combined mass fraction of the insoluble fillers in this case is in the range from 1 to 50%, preferably in the range from 2 to 40%, more preferably in the range from 5 to 30%.

For later use in the end application, it is advantageous for the handling properties if the curable adhesive has an intrinsic pressure-sensitive adhesiveness and can therefore be classified as a pressure-sensitive adhesive. As a result of the advantageously high cohesion in curable adhesives of the invention, it is particularly easy to establish these properties in curable adhesives of the invention. Prior to the curing of the curable adhesives, the pressure-sensitive adhesiveness permits a reliable and secure application of the reactive adhesive tapes on the substrate. Preference is therefore given to a curable adhesive of the invention wherein the curable adhesive is a pressure-sensitive adhesive.

A pressure-sensitive adhesive (PSA), in agreement with the understanding of the skilled person, is an adhesive which possesses pressure-sensitive adhesive properties, i.e. has the capacity to enter into a durable bond with respect to a substrate even under relatively weak applied pressure. Corresponding pressure-sensitive adhesive tapes are typically redetachable from the substrate substantially without residue after use, and in general have a permanent intrinsic tack even at room temperature, meaning that they have a certain viscosity and touch-tackiness, so that they wet the surface of a substrate even under low applied pressure. The pressure-sensitive adhesiveness of a pressure-sensitive adhesive tape is a product of the use as adhesive of a pressure-sensitive adhesive. Without wishing to be tied to this theory, it is frequently assumed that a PSA may be considered to be a fluid of extremely high viscosity with an elastic component, accordingly having characteristic viscoelastic properties which lead to the above-described durable intrinsic tackiness and pressure-sensitive adhesive capability. It is assumed that with such PSAs, on mechanical deformation, there are viscous flow processes and there is development of elastic forces of resilience. The viscous flow component serves for achieving adhesion, while the elastic forces of resilience component is needed in particular for the achievement of cohesion. The relationships between the rheology and the pressure-sensitive adhesiveness are known in the prior art and described for example in Satas, "Handbook of Pressure Sensitive Adhesives Technology", Third Edition, (1999), pages 153 to 203. To characterize the extent of elastic and viscous components, it is usual to employ the storage modulus (G') and the loss modulus (G"), which may be ascertained by dynamic mechanical analysis (DMA), using a rheometer, for example, as disclosed for example in WO 2015/189323. For the purposes of the present invention, an adhesive is understood preferably to have pressure-sensitive adhesiveness and hence to be a PSA when at a temperature of 23° C. in the deformation frequency range from $10^0$ to $10^1$ rad/sec, G' and G" are each situated at least partly within the range from $10^3$ to $10^7$ Pa.

Disclosed below are illustrative curable adhesives which according to the estimation of the inventors are particularly advantageous and which describe particularly preferred feature combinations, with particular preference being given to curable adhesives of the invention that comprise two or more of the illustrative curable adhesives.

Initially preferred is a first thermally curable adhesive of the invention, comprising the following based on the mass of the adhesive: i) a corresponding (meth)acrylate block copolymer of the structure A-B-A, as for example Kurarity LA2140, LA2250 or LA3320, in a mass fraction in the range from 30 to 45%, ii) a liquid epoxide, as for example Epikote828, in a mass fraction in the range from 20 to 35%, iii) a solid epoxide, as for example Araldite ECN 1273, in a mass fraction in the range from 20 to 35%, iv) a curing agent, as for example dicyandiamide, in a mass fraction in the range from 2 to 6%, and v) an accelerator, as for example Curezol MZ-A, in a mass fraction in the range from 0.01 to 0.5%.

Also preferred is a second thermally curable adhesive of the invention, comprising the following based on the mass of the adhesive: i) a corresponding (meth)acrylate block copolymer of the structure A-B-A, as for example Kurarity LA2140, LA2250 or LA3320, in a mass fraction in the range from 45 to 60%, ii) a liquid epoxide, as for example Epikote828, in a mass fraction in the range from 15 to 30%, iii) a solid epoxide, as for example Araldite ECN 1273, in a mass fraction in the range from 15 to 30%, iv) a curing agent, as for example dicyandiamide, in a mass fraction in the range from 2 to 5%, and v) an accelerator, as for example Curezol MZ-A, in a mass fraction in the range from 0.01 to 0.5%.

Also preferred is a third thermally curable adhesive of the invention, comprising the following based on the mass of the adhesive: i) a corresponding (meth)acrylate block copolymer of the structure A-B-A, as for example Kurarity LA2140, LA2250 or LA3320, in a mass fraction in the range from 25 to 50%, ii) a liquid epoxide, as for example Epikote828, in a mass fraction in the range from 10 to 25%, iii) a solid epoxide, as for example Araldite ECN 1273, in a mass fraction in the range from 10 to 25%, iv) a curing agent, as for example dicyandiamide, in a mass fraction in the range from 2 to 5%, v) an accelerator, as for example Curezol MZ-A, in a mass fraction in the range from 0.01 to 0.5% and vi) a filler, as for example Silibeads 5211, in a mass fraction of 30%.

Also preferred is a fourth thermally curable adhesive of the invention, comprising the following based on the mass of the adhesive: i) a corresponding (meth)acrylate block copolymer of the structure A-B-A, as for example Kurarity LA2140, LA2250 or LA3320, in a mass fraction in the range from 25 to 35%, ii) a liquid epoxide, as for example Epikote 828, in a mass fraction in the range from 10 to 25%, iii) a solid epoxide, as for example Araldite ECN 1273, in a mass fraction in the range from 10 to 40%, iv) a high-viscosity epoxide, as for example Struktol PD3611 (viscosity at 25° C. of more than 150 Pa s), in a mass fraction in the range from 10 to 40%, v) a curing agent, as for example dicyandiamide, in a mass fraction in the range from 2 to 7%, and vi) an accelerator, as for example Curezol MZ-A, in a mass fraction in the range from 0.01 to 0.7%.

Also preferred is a fifth photocurable adhesive of the invention, comprising the following based on the mass of the adhesive: i) a corresponding (meth)acrylate block copolymer of the structure A-B-A, as for example Kurarity LA2140, LA2250 or LA3320, in a mass fraction in the range from 25 to 50%, ii) a liquid epoxide, as for example bisphenol A diglycidyl ether (e.g. Epikote828) or cycloaliphatic epoxides (e.g. Uvacure 1500) in a mass fraction in the range from 10 to 45%, iii) a solid epoxide, as for example bisphenol A diglycidyl ether (e.g. Araldite GT 7072) or epoxy-cresol and/or epoxy phenol novolacs (e.g. Araldite ECN 1273), in a mass fraction in the range from 10 to 45%, iv) optionally a polyol open time additive, as for example polyethylene glycol ($M_n$~400 g/mol) or polycaprolactone (e.g. Capa2000), in a mass fraction in the range from 0.5 to 15%, more particularly 0.5 to 10% or 5 to 15%, and v) a photoinitiator, as for example a triarylsulfonium antimonate salt, in a mass fraction in the range from 0.3 to 2%; particularly preferred is a photocurable adhesive of the invention which comprises a combined mass fraction of less than 0.9% of polyol open time additive vi) or else contains no polyol open time additive vi) (i.e. combined mass fraction of less than 0.001%) and is therefore free from polyol open time additive vi). Particularly preferred, therefore, is a photocurable adhesive of the invention, comprising or consisting of the following, based on the mass of the adhesive: i) a corresponding (meth)acrylate block copolymer of the structure A-B-A, as for example Kurarity LA2140, LA2250 or LA3320, in a mass fraction in the range from 25 to 50%, ii) a liquid epoxide, as for example (an optionally hydrogenated) bisphenol A diglycidyl ether (e.g. Epikote 828 or HBE-100) or cycloaliphatic epoxides (e.g. Uvacure 1500) in a mass fraction in the range from 10 to 45%, iii) a solid epoxide, as for example bisphenol A diglycidyl ether (e.g. Araldite GT 7072) or epoxy-cresol and/or epoxy-phenol novolacs (e.g. Araldite ECN 1273), in a mass fraction in the range from 10 to 45%, and v) a photoinitiator, as for example a triarylsulfonium antimonate salt, in a mass fraction in the range from 0.3 to 2%.

Also preferred is a sixth photocurable adhesive of the invention, comprising the following based on the mass of the adhesive: i) a corresponding (meth)acrylate block copolymer of the structure A-B-A, as for example Kurarity LA2140, LA2250 or LA3320, in a mass fraction in the range from 45 to 70%, ii) a liquid epoxide, as for example bisphenol A diglycidyl ether (e.g. Epikote 828) or cycloaliphatic epoxides (e.g. Uvacure 1500) in a mass fraction in the range from 10 to 45%, iii) a solid epoxide, as for example bisphenol A diglycidyl ether (e.g. Araldite GT 7072) or epoxy-cresol and/or epoxy-phenol novolacs (e.g. Araldite ECN 1273), in a mass fraction in the range from 10 to 45%, iv) optionally a polyol open time additive, as for example polyethylene glycol ($M_n$~400 g/mol) or polycaprolactone (e.g. Capa2000), in a mass fraction in the range from 0.5 to 15%, more particularly 0.5 to 10% or 5 to 15%, and v) a photoinitiator, as for example a triarylsulfonium antimonate salt, in a mass fraction in the range from 0.3 to 2%; particularly preferred is a photocurable adhesive of the invention which comprises a combined mass fraction of less than 0.9% polyol open time additive vi) or else contains no polyol open time additive vi) (i.e. combined mass fraction of less than 0.001%) and is therefore free of polyol open time additive vi). Particularly preferred, therefore, is a photocurable adhesive of the invention, comprising or consisting of the following, based on the mass of the adhesive: i) a corresponding (meth)acrylate block copolymer of the structure A-B-A, as for example Kurarity LA2140, LA2250 or LA3320, in a mass fraction in the range from 45 to 70%, ii) a liquid epoxide, as for example (an optionally hydrogenated) bisphenol A diglycidyl ether (e.g. Epikote 828 or HBE-100) or cycloaliphatic epoxides (e.g. Uvacure 1500) in a mass fraction in the range from 10 to 45%, iii) a solid epoxide, as for example bisphenol A diglycidyl ether (e.g. Araldite GT 7072) or epoxy-cresol and/or epoxy-phenol novolacs (e.g. Araldite ECN 1273), in a mass fraction in the range from 10 to 45%, and v) a photoinitiator, as for example a triarylsulfonium antimonate salt, in a mass fraction in the range from 0.3 to 2%.

Also preferred is a seventh photocurable adhesive of the invention, comprising the following based on the mass of the adhesive: i) a corresponding (meth)acrylate block copolymer of the structure A-B-A, as for example Kurarity LA2140, LA2250 or LA3320, in a mass fraction in the range from 30 to 60%, ii) a liquid epoxide, as for example (an optionally hydrogenated) bisphenol A diglycidyl ether (e.g. Epikote 828 or HBE-100) or cycloaliphatic epoxides (e.g. Uvacure 1500) in a mass fraction in the range from 20 to 45%, iii) a solid epoxide, as for example bisphenol A diglycidyl ether (e.g. Araldite GT 7072) or epoxy-cresol and/or epoxy-phenol novolacs (e.g. Araldite ECN 1273), in a mass fraction in the range from 10 to 40%, iv) optionally a polyol open time additive, as for example polyethylene glycol ($M_n$~400 g/mol), or a non-polyol open time additive, as for example polyethylene glycol dimethyl ether 500, in a mass fraction in the range from 0.5 to 10%, and v) a photoinitiator, as for example a triarylsulfonium antimonate salt, in a mass fraction in the range from 0.3 to 2%. Especially preferred is for this photocurable adhesive of the invention to comprise a combined mass fraction of less than 0.9% of polyol open time additive or to contain no polyol open time additive (i.e. combined mass fraction of less than 0.001%) and to be therefore free from polyol open time additive.

Also preferred is an eighth photocurable adhesive of the invention, comprising the following based on the mass of the adhesive: i) a corresponding (meth)acrylate block copolymer of the structure A-B-A, as for example Kurarity LA2140, LA2250 or LA3320, in a mass fraction in the range from 30 to 60%, ii) a liquid epoxide (e.g. Epikote 828 or Uvacure 1500), more preferably a hydrogenated bisphenol A diglycidyl ether or hydrogenated bisphenol F diglycidyl ether (e.g. HBE-100) in a mass fraction in the range from 20 to 50%, iii) a solid epoxide, as for example bisphenol A diglycidyl ether (e.g. Araldite GT 7072) or epoxy-cresol and/or epoxy-phenol novolacs (e.g. Araldite ECN 1273), in a mass fraction in the range from 20 to 40%, iv) optionally a polyol open time additive, as for example polyethylene glycol ($M_n$~400 g/mol), or a non-polyol open time additive, as for example polyethylene glycol dimethyl ether 500, in a mass fraction in the range from 0.5 to 10%, and v) a photoinitiator, as for example a triarylsulfonium antimonate salt, in a mass fraction in the range from 0.3 to 2%. Especially preferred is for this photocurable adhesive of the invention to comprise a combined mass fraction of less than 0.9% of polyol open time additive or to contain no polyol open time additive (i.e. combined mass fraction of less than 0.001%) and to be therefore free from polyol open time additive.

Curable adhesives of the invention may be employed, for example, directly as adhesives; depending on method of application, they may also be provided, for example, in the form of tapes. With a view to extremely beneficial handling qualities, however, particularly advantageous results are generally achieved when curable adhesives of the invention are employed as an adhesive layer of a single-sided or double-sided adhesive tape further comprising a carrier layer. The invention therefore also relates to an adhesive tape, more particularly reactive adhesive tape, comprising as adhesive layer a curable adhesive of the invention, with the adhesive tape preferably comprising a carrier layer.

The term “adhesive tape” is clear to the person skilled in the art of adhesive bonding. In the context of the present invention, the expression “tape” denotes all thin, sheetlike structures, i.e. structures having a predominant extent in two dimensions, more particularly films, film portions and labels, preferably tapes with extended length and limited width, and also corresponding tape portions.

The carrier layer usually designates that layer of a multilayer adhesive tape of this kind that critically determines the mechanical and physical properties of the adhesive tape, such as the tear resistance, stretchability, insulation capacity or resilience, for example. Examples of customary materials for the carrier layer are woven fabrics, laid scrims and polymeric films, for example PET films and polyolefin films. The carrier layer, however, may also itself be pressure-sensitively adhesive. The adhesive tape of the invention may in one preferred embodiment be a double-sided adhesive tape whose carrier layer is provided on both sides with a curable adhesive of the invention.

In adhesive tapes of the invention, the adhesive layers may be lined with what is called a release liner, in order to enable trouble-free unwinding and to protect the PSA from fouling. Such release liners customarily consist of a single-sidedly or double-sidedly siliconized polymeric film (e.g. PET or PP) or of a siliconized paper carrier.

Further disclosed, starting from the curable adhesive of the invention and from the adhesive tape of the invention, is the use of a curable adhesive of the invention or of an adhesive tape of the invention for the bonding of two or more components through curing of the curable adhesive.

Lastly disclosed is also a process for producing a curable adhesive of the invention, comprising the process steps of:

a) preparing or providing a (meth)acrylate block copolymer of the structure A-B-A, and
b) mixing the (meth)acrylate block copolymer with one or more first epoxide compounds E1 and one or more second epoxide compounds E2 and one or more initiators, and also, optionally, one or more further additives, to give the curable adhesive.

Below, preferred embodiments of the invention are further elucidated and described with reference to experiments.

A. PRODUCTION OF THE CURABLE ADHESIVES

Synthesis of a Random Comparative Copolymer (VP1)

The reactions were carried out under nitrogen atmosphere at room temperature (25° C.) in a screw-top EPA bottle with a volume of 60 ml. The radiation source used comprised two Skymore 110 W UV LED nail-dryer lamps having a power each of 110 W and an emitted wavelength of 365 nm, the lamps being placed in such a way as to allow the reaction vessel to be positioned at a distance of 2 cm from the LEDs.

A mixture of 320 mg of S,S-dibenzyl trithiocarbonate (DBTTC), 16 g of methyl methacrylate (MMA, $\delta_p$=9.31 MPa$^{0.5}$), 24 g of n-butyl acrylate (BA, $\delta_p$=8.60 MPa$^{0.5}$) and 9 g of toluene was homogenized and then flushed with nitrogen for 10 min. The polymerization was initiated by irradiation of the reaction mixture. To end the reaction, the irradiation was paused and the high-viscosity reaction mixture was dissolved in THF, precipitated dropwise from an excess of cold methanol, and filtered to recover the precipitate. The molecular weight of the random comparative copolymer VP1 was 120,000 g/mol.

Production of the Curable Adhesives

From the random comparative copolymer VP1 and a commercially available A-B-A (meth)acrylate block copolymer with the same fundamental monomer composition (P1, Kurarity LA2250 ($M_n$: around 60,000 g/mol and $M_w$: around 66,000 g/mol) or P2, Kurarity LA3320 ($M_n$: around 108,000 g/mol and $M_w$: around 119,000 g/mol)), with A blocks consisting of polymethyl methacrylate ($\delta_p$=9.31 MPa$^{0.5}$) and a B block consisting of poly-n-butyl acrylate ($\delta_p$=8.60 MPa$^{0.5}$), curable adhesives were obtained in a customary way by mixing with the further components.

As first epoxide compounds E1, use was made of a commercially available solid bisphenol A diglycidyl ether (E1a, D.E.R. 662E or E1b, Araldite GT 7072). As second epoxide compounds E2, use was made of a commercially available liquid cycloaliphatic epoxide (E2a, epoxycyclohexylmethyl 3',4'-epoxycyclohexanecarboxylate; Uvacure 1500) or a commercially available liquid bisphenol A diglycidyl ether (E2b, Epikote 828 or E2d, Araldite GY 250) or a commercially available liquid hydrogenated bisphenol A diglycidyl ether (E2c, HBE-100).

As open time additive, use was made of polyethylene glycol 400 (PEG 400) or polyethylene glycol dimethyl ether 500 (CAS: 24991-55-7), and as initiator, use was made of triarylsulfonium hexafluoroantimonate (CAS: 109037-75-4).

The composition of the adhesives is summarized in table 4. From the adhesives, by coating out and evaporation of the solvent, adhesive tapes having a thickness of about 100 μm were produced.

TABLE 4

Composition of adhesives together with solvents; all figures in parts by weight

| | B1 | B2 | B3 | B4 | B5 | B6 | B7 |
|---|---|---|---|---|---|---|---|
| P1 (Kurarity LA2250) | 30 | 40 | 60 | 40 | | | |
| P2 (Kurarity LA3320) | | | | | 35 | 35 | 35 |
| E1a (D.E.R. 662E) | 40 | 30 | 20 | 30 | | | |
| E1b (Araldite GT 7072) | | | | | 20 | 40 | 40 |
| E2a (Uvacure 1500) | 30 | 30 | | | | 25 | |
| E2b (Epikote 828) | | | | 30 | | | |
| E2c (HBE-100) | | | 20 | | 25 | | 25 |
| E2d (Araldite GY 250) | | | | | 20 | | |
| PEG 400 | 5 | 5 | 5 | 5 | | | |
| Polyethylene glycol dimethyl ether 500 | | | | | 5 | 5 | 5 |
| Triarylsulfonium hexafluoroantimonate | 1 | 1 | 1 | 1 | 0.5 | 0.5 | 0.5 |
| Acetone | 100 | 100 | 100 | 100 | 100 | 100 | 100 |

| | V1 | V2 | V3 |
|---|---|---|---|
| P1 (Kurarity LA2250) | | | 15 |
| VP1 | 30 | 50 | |
| E1a (D.E.R. 662E) | 40 | | 40 |
| E2a (Uvacure 1500) | 30 | 50 | |
| E2b (Epikote 828) | | | 40 |
| PEG 400 | 5 | 5 | 5 |
| Triarylsulfonium hexafluoroantimonate | 1 | 1 | 1 |
| Acetone | 100 | 100 | 100 |

B. Bonding Experiments

The peel adhesions were determined in analogy to ISO 29862 (method 3) at 23° C. and 50% relative humidity, with a removal velocity of 300 mm/min and a removal angle of 180°. The thickness of the layer of adhesive in each case here was 100 μm. The reinforcing film used was an etched PET film having a thickness of 50 μm, as is available from Coveme (Italy). The substrate used comprised steel plates in accordance with the standard. The uncured measuring strip was bonded here by means of a roll-on machine with 4 kg at a temperature of 23° C. The adhesive tapes were removed immediately after application. The measured value (in N/cm) was obtained as the mean value from three individual measurements, and the failure mode was documented as follows: adhesive failure (A) or cohesive failure (C).

The lap-shear strength was also determined on the cured adhesives. The bond strength was determined in a dynamic lap-shear experiment in accordance with DIN-EN 1465 at 23° C. and 50% relative humidity for a test velocity of 1 mm/min, the determination being quantitative in each case (results in $N/mm^2$=MPa). The test bars employed were steel bars which had been cleaned with acetone prior to bonding. The layer thicknesses of the adhesive tapes corresponded in each case to the details above. In this case the adhesive tapes, prior to the assembly of the test bars but after the removal of the second liner, were irradiated using appropriate light and the test specimens were assembled immediately thereafter. The measurement took place after seven days of storage at 23° C. and 50% relative humidity. The result reported is the mean value from three measurements.

Moreover, the shock resistance of the cured adhesives was investigated. The shock test employed for this purpose provides information about the bond strength of an adhesive product in the direction normal to the adhesive layer. Provided for this test are a circular first substrate (1) (polycarbonate, Makrolon 099, thickness 3 mm) having a diameter of 21 mm, a second substrate (2) (polycarbonate, Makrolon 099, thickness 3 mm), which is implemented in a square shape with a side length of 40 mm and which has a circular opening (drilled hole) arranged centrally, 9 mm in diameter, and the adhesive film samples for investigation, which were likewise produced circularly with a diameter of 21 mm (cut to size or diecut).

From the corresponding three components, a test element is produced by first bonding the adhesive film sample by the free surface exactly onto the substrate (1). The temporary protective film (siliconized PET liner) is then removed and the curable adhesive is activated by irradiation with at least 1000 $mJ/cm^2$ from a 365 nm UV-LED. The assembly thus produced is then applied, by the now exposed side of the adhesive product, concentrically onto the substrate 2 within two minutes, concentrically meaning that the circular cutout in the substrate 2 is positioned precisely centrally above the circular first substrate 1 (with a resulting bond area of 282 $mm^2$) and is compressed with a force of at least 280 N for at least 10 s, to produce the test element.

After having been pressed, the test elements are conditioned for 72 hours at 23° C. and 50% relative humidity.

After the corresponding storage, the test elements are each clamped into a sample holder so that the assembly is aligned horizontally. The test element with the polycarbonate sheet (substrate 1) is inserted downwardly into the sample holder. The sample holder is subsequently inserted centrically into the provided holder of the apparatus used ("DuPont Impact Tester", from Cometech, Taiwan, model QC-641). The impact head is inserted such that the circular, rounded striking geometry with the diameter of 5 mm lies centrically and flush on the bonding side of the substrate 1. A weight (carriage) guided on two guide rods and having a mass of 307 g is caused to drop perpendicularly from a height of initially 5 cm onto the above-prepared assembly composed of sample holder, test element and impact head (measuring conditions: 23° C., 50% relative humidity). The height from which the weight is dropped (h) is increased in steps of 5 cm until the impact energy introduced destroys the test elements as a result of the impact load, and the polycarbonate sheet (substrate 1) parts from the baseplate (substrate 2). In order to be able to compare experiments with different test elements, the energy is calculated as follows:

$$\text{DuPont shock }[\text{mJ/cm}^2]=(m(\text{carriage})[\text{kg}]*9.81[\text{kg/m}*\text{s}^2]*h[m])/A(\text{bond area})[\text{cm}^2]$$

Five samples per adhesive are tested, and the mean value for the energy calculated is reported as an index for the impact strength. The results of the experiments are summarized in table 5.

TABLE 5

Summary of the bonding experiments

| | B1 | B2 | B3 | B4 | V1 | V2 | V3 |
|---|---|---|---|---|---|---|---|
| Fracture mode*/ peel adhesion | A (>1 N/cm) | A (>1 N/cm) | A (>1 N/cm) | A (>1 N/cm) | C | C | C |
| Lap-shear test/MPa | >4 | >4 | >5 | >4 | >4 | >4 | >4 |
| Shock (PC-PC)/mJ/cm$^2$ | >200 | >200 | >200 | >200 | <50 | <100 | <150 |

| | B5 | B6 | B7 |
|---|---|---|---|
| Fracture mode*/ peel adhesion | A (>1 N/cm) | A (>1 N/cm) | A (>1 N/cm) |
| Lap-shear test/MPa | >5 | >4 | >5 |
| Shock (PC-PC)/mJ/cm$^2$ | >250 | >250 | >250 |

*A: adhesive failure; C: cohesive failure

On the basis of the fracture mode in the peel adhesion test it is possible to demonstrate the advantageous cohesion-boosting effect of the (meth)acrylate block copolymers employed in adhesives of the invention, advantageously also when large amounts of reactive resin are used. The experiments show, moreover, that with (meth)acrylate block copolymers in combination with specific reactive resins, reactive adhesives are obtainable that have significantly improved shock resistance. In this context, examples B5 to B7 show that the shock resistance can be improved through the use of relatively high molecular weight (meth)acrylate block copolymers (such as Kurarity LA3320) in the adhesives of the invention. This effect may perhaps be attributable not only to the high molecular weight of LA3320 (Mw: around 119,000 g/mol) in comparison to LA2250 (Mw: around 66,000 g/mol for LA2250). Without being tied to a particular theory, the inventors believe that possibly in LA3320 the lower hard block fraction of just below 20% of MMA, in combination with the increased molecular weight, means that the middle block in the cured epoxide adhesive tape is present with better phase separation and therefore has a stronger positive influence on the shock performance. In further experiments the inventors have determined that this surprising effect occurs even in a comparison of the even more similar LA2330 and LA3320 and leads to an improvement in the shock resistance (more than 50 mJ/cm$^2$).

In comparison to the prior art, it has surprisingly been found that in curable adhesives of the invention, significantly greater amounts of (meth)acrylate block copolymer are outstandingly suitable for achieving not only good pressure-sensitive adhesives in the uncured state (adhesive failure in the peel adhesion test) but also strong bonds in the cured state. If the skilled person employs quantities of (meth)acrylate block copolymer known in principle from other adhesive systems, as shown in V3, the resulting adhesives tend to be paste-like, and lack suitability as pressure-sensitive adhesive.

The lap-shear tests after curing show that the adhesives of the invention cure to enable good bond strengths to be achieved, this being an indicator of sufficient adaptation behaviour. The advantage of the adhesives of the invention is evident in particular in the positive combination of the properties before and after curing.

Furthermore, examples B3, B5 and B7 show vividly that hydrogenated epoxide compounds in the adhesives of the invention result in higher bond strengths.

The invention claimed is:

1. A curable adhesive comprising, based on the mass of the curable adhesive:

a) one or more (meth)acrylate block copolymers of the structure A-B-A in a combined mass fraction of 25% or more, where the A blocks independently of one another stand for a poly(meth)acrylate having a glass transition temperature Tg of 50° C. or more which is preparable by polymerization of an A monomer composition composed of A monomers, where the B block stands for a poly(meth)acrylate having a glass transition temperature Tg of less than 50° C. which is preparable by polymerization of a B monomer composition composed of B monomers, b) one or more polymerizable first epoxide compounds E1 in a combined mass fraction of 5% or more, where the first epoxide compound E1 at 25° C. is a solid or a high-viscosity substance having a dynamic viscosity of 50 Pa s or more, and c) one or more polymerizable second epoxide compounds E2 in a combined mass fraction of 5% or more, where the second epoxide compound E2 at 25° C. is a liquid having a dynamic viscosity of 40 Pa s or less, where the amount-of-substance-weighted polar component of the Hansen solubility parameters $<\delta_p>$ of the monomer units derived from A monomers in the A blocks, $<\delta_p>(A)$, is in the range from 9.0 to 11.0 $MPa^{0.5}$, where the amount-of-substance-weighted polar component of the Hansen solubility parameters $<\delta_p>$ of the monomer units derived from B monomers in the B blocks, $<\delta_p>(B)$ is less than 9 $MPa^{0.5}$, and where the (meth)acrylate block copolymers have a weight-average molecular weight of 115,000 g/mol to 1,000,000 g/mol.

2. The curable adhesive according to claim 1, where the amount-of-substance-weighted polar component of the Hansen solubility parameters $<\delta_p>$ of the monomer units derived from A monomers in the A blocks, $<\delta_p>(A)$, is in the range from 9.1 to 10.0 $MPa^{0.5}$.

3. The curable adhesive according to claim 1, where the amount-of-substance-weighted polar component of the Hansen solubility parameters $<\delta_p>$ of the monomer units derived from B monomers in the B blocks, $<\delta_p>(B)$, is in the range from 6.0 to 8.9 $MPa^{0}$.

4. The curable adhesive according to claim 1, where the A monomer composition comprises one or more A monomers which are selected from the group consisting of methyl methacrylate, ethyl acrylate, methyl acrylate, 2-phenoxydiethylene glycol acrylate and tert-butyl acrylate.

5. The curable adhesive according to claim 1, where the B monomer composition comprises one or more B monomers which are selected from the group consisting of n-butyl acrylate, 2-ethylhexyl acrylate, n-octyl acrylate, isobornyl acrylate, 2-phenoxyethyl acrylate, propylheptyl acrylate and acrylic acid.

6. The curable adhesive according to claim 1, where the combined mass fraction of the (meth)acrylate block copolymers in the curable adhesive is 28% or more.

7. The curable adhesive according to claim 1, where the combined mass fraction of the first epoxide compounds E1 in the curable adhesive is 10% or more.

8. The curable adhesive according to claim 1, where the combined mass fraction of the second epoxide compound E2 in the curable adhesive is 10% or more.

9. The curable adhesive according to claim 1, where the one or the two or more first epoxide compounds E1 and/or the one or the two or more second epoxide compounds E2 are selected from epoxide compounds having at least one cycloaliphatic group.

10. An adhesive tape comprising as adhesive layer the curable adhesive according to claim 1.

11. The curable adhesive according to claim 2, where the amount-of-substance-weighted polar component of the Hansen solubility parameters $<\delta_p>$ of the monomer units derived from A monomers in the A blocks, $<\delta_p>(A)$, is in the range from 9.2 to 9.5 $MPa^{0.5}$.

12. The curable adhesive according to claim 2, where the amount-of-substance-weighted polar component of the Hansen solubility parameters $<\delta_p>$ of the monomer units derived from A monomers in the A blocks, $<\delta_p>(A)$, is in the range from 9.3 to 9.4 $MPa^{0.5}$.

13. The curable adhesive according to claim 3, where the amount-of-substance-weighted polar component of the Hansen solubility parameters $<<\delta_p>$ of the monomer units derived from B monomers in the B blocks, $<\delta_p>(B)$, is in the range from 6.5 to 8.8 $MPa^{0.5}$.

14. The curable adhesive according to claim 3, where the amount-of-substance-weighted polar component of the Hansen solubility parameters $<\delta_p>$ of the monomer units derived from B monomers in the B blocks, $<\delta_p>(B)$, is in the range from 7.0 to 8.7 $MPa^{0.5}$.

15. The curable adhesive according to claim 6, where the combined mass fraction of the (meth)acrylate block copolymers in the curable adhesive is 30% or more.

16. The curable adhesive according to claim 6, where the combined mass fraction of the (meth)acrylate block copolymers in the curable adhesive is 33% or more.

17. The curable adhesive according to claim 7, where the combined mass fraction of the first epoxide compounds E1 in the curable adhesive is 15% or more.

18. The curable adhesive according to claim 7, where the combined mass fraction of the first epoxide compounds E1 in the curable adhesive is 20% or more.

19. The curable adhesive according to claim 8, where the combined mass fraction of the second epoxide compound E2 in the curable adhesive is 20% or more or 30% or more.

20. The curable adhesive according to claim 9, where epoxide compounds having at least one cycloaliphatic group are selected from epoxide compounds having at least one a cyclohexyl group and/or dicyclopentadienyl group.

21. The curable adhesive according to claim 1, where the one or the two or more first epoxide compounds E1 and/or the one or the two or more second epoxide compounds E2 are selected from hydrogenated bisphenol A diglycidyl ethers or hydrogenated bisphenol F diglycidyl ethers.

22. The curable adhesive according to claim 1, further comprising less than 0.9% of polyol open time additive.

23. The curable adhesive according to claim 1, further comprising a non-polyol open time additive.

24. The curable adhesive according to claim 1, further comprising:

i) less than 0.9% of polyol open time additive, and ii) a non-polyol open time additive.

25. The curable adhesive according to claim 1, wherein a ratio of the combined mass of the (meth)acrylate block copolymers to the combined mass of the first epoxide compounds E1 and of the second epoxide compounds E2 in the curable adhesive is in the range from 0.35:1 to 4:1.

26. The curable adhesive according to claim 1, wherein a ratio of the combined mass of the first epoxide compounds E1 to the combined mass of the second epoxide compounds E2 in the curable adhesive is in the range from 1:10 to 10:1.

* * * * *